US012743264B2

(12) United States Patent
Takahashi

(10) Patent No.: US 12,743,264 B2
(45) Date of Patent: Sep. 22, 2026

(54) INFORMATION PROCESSING APPARATUS THAT RESRICTS UPDATE OF PREDETERMINED FIRMWARE BEFORE COMPLETING SETUP FOR ACTIVATING A SUBSCRIPTION SERVICE, IMAGE FORMING APPARATUS, COMPUTER READABLE STORAGE MEDIUM, AND SOFTWARE UPDATE METHOD

(71) Applicant: CANON KABUSHIKI KAISHA, Tokyo (JP)

(72) Inventor: Daiki Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 18/413,215

(22) Filed: Jan. 16, 2024

(65) Prior Publication Data

US 2024/0256256 A1 Aug. 1, 2024

(30) Foreign Application Priority Data

Jan. 31, 2023 (JP) ................................ 2023-013401

(51) Int. Cl.
*G06F 8/65* (2018.01)
*G06F 3/12* (2006.01)

(52) U.S. Cl.
CPC .............. *G06F 8/65* (2013.01); *G06F 3/1204* (2013.01); *G06F 3/123* (2013.01); *G06F 3/1285* (2013.01)

(58) Field of Classification Search
CPC .......... G06F 8/65; G06F 3/1204; G06F 3/123; G06F 3/1285
See application file for complete search history.

(56) References Cited

U.S. PATENT DOCUMENTS 6,930,785 B1 * 8/2005 Weyand .................... G06F 8/65 358/1.13
2006/0026304 A1 * 2/2006 Price ......................... G06F 8/65 710/8
2009/0307678 A1 * 12/2009 Wu .......................... G06F 8/65 717/168
2011/0289496 A1 * 11/2011 Steer ......................... G06F 8/65 717/169
2017/0264514 A1 * 9/2017 Thimsen ............. G06F 11/1456
2018/0217786 A1 * 8/2018 Sakai .................... G06F 3/1288
2022/0035620 A1 * 2/2022 Hamasaki ................. G06F 8/65
2022/0091841 A1 * 3/2022 Serra Junyent ......... G06F 3/123
2022/0171584 A1 6/2022 Onoguchi
2022/0174172 A1 * 6/2022 Yokoyama ......... H04N 1/00435
2024/0089582 A1 * 3/2024 Weber .................... G06Q 10/10

FOREIGN PATENT DOCUMENTS

JP 2022085782 A 6/2022

* cited by examiner

*Primary Examiner* — Nicholas Pachol
(74) *Attorney, Agent, or Firm* — Venable LLP

(57) ABSTRACT

Provided is an information processing apparatus including: one or more memories storing instructions, and one or more processors capable of executing the instructions causing the information processing apparatus to: restrict a process related to updating predetermined software of the information processing apparatus in a case where initial setup of a subscription service involving communication with a server has not been completed; and execute the process related to updating the predetermined software in a case where the initial setup is completed and update information on update of the predetermined software is received.

13 Claims, 28 Drawing Sheets

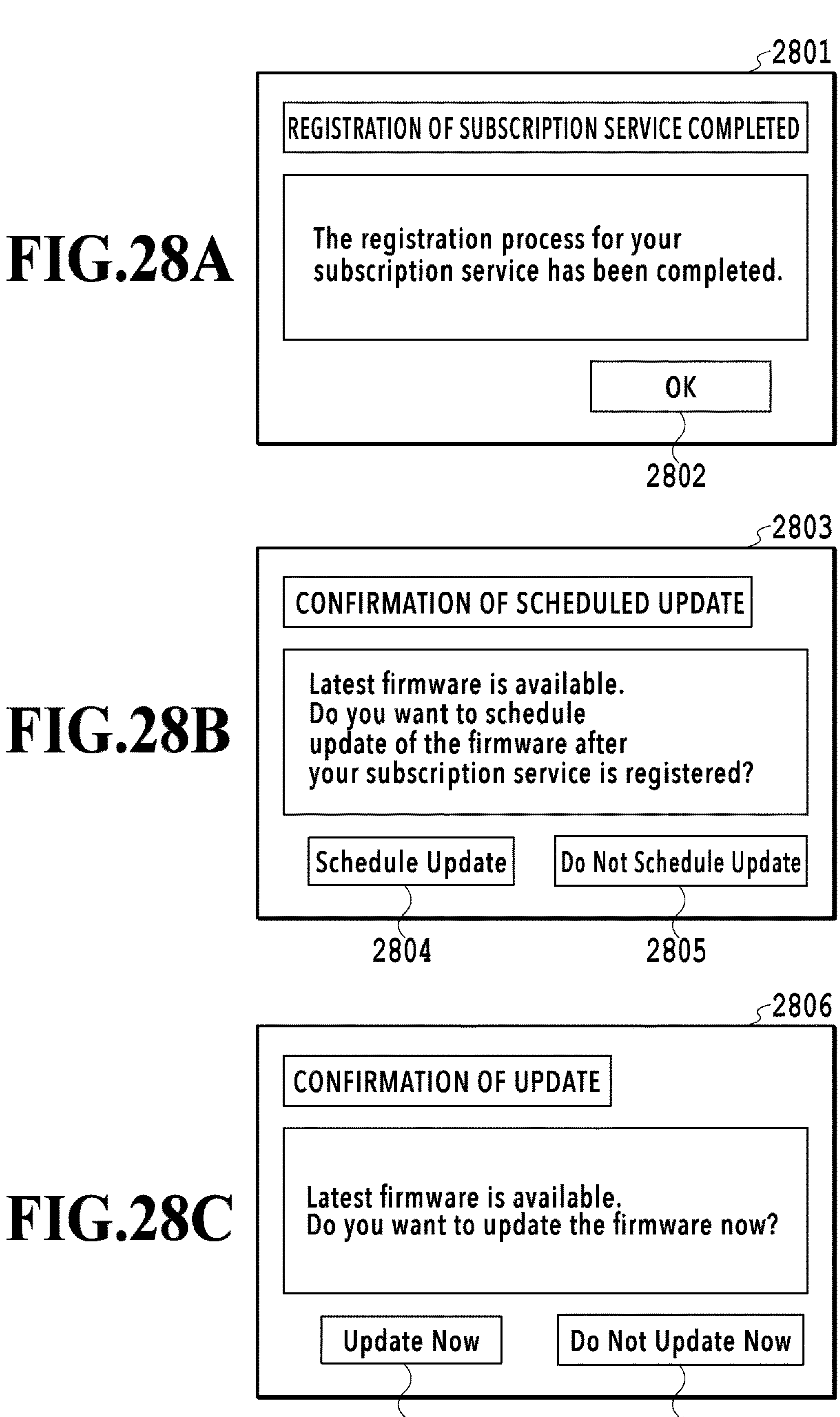
FIG.28A
2801
REGISTRATION OF SUBSCRIPTION SERVICE COMPLETED
The registration process for your subscription service has been completed.
OK
2802
FIG.28B
2803
CONFIRMATION OF SCHEDULED UPDATE
Latest firmware is available.
Do you want to schedule update of the firmware after your subscription service is registered?
Schedule Update
Do Not Schedule Update
2804
2805
FIG.28C
2806
CONFIRMATION OF UPDATE
Latest firmware is available.
Do you want to update the firmware now?
Update Now
Do Not Update Now
2807
2808

INFORMATION PROCESSING APPARATUS THAT RESRICTS UPDATE OF PREDETERMINED FIRMWARE BEFORE COMPLETING SETUP FOR ACTIVATING A SUBSCRIPTION SERVICE, IMAGE FORMING APPARATUS, COMPUTER READABLE STORAGE MEDIUM, AND SOFTWARE UPDATE METHOD

BACKGROUND OF THE DISCLOSURE

Field of the Disclosure

The present invention relates to an information processing apparatus, an image forming apparatus, a computer readable storage medium, and a software update method.

Description of the Related Art

An image forming apparatus is a type of information processing apparatus, and firmware, which is a type of software, is installed in such an image forming apparatus. A processor included in the image forming apparatus reads and executes the firmware to implement various functions of the image forming apparatus. The firmware is repetitively updated to add functions to the image forming apparatus and improve its functions. For this reason, the firmware installed in an image forming apparatus delivered to a user is not always the latest version. Specifically, the firmware installed in the image forming apparatus delivered to the user is not the latest version in a case where the firmware is updated in the period from when the image forming apparatus is manufactured to when it is delivered to the user. Incidentally, a subscription service has been known in which, for example, a user is provided with consumables from a service provider and additionally offered maintenance of image forming apparatus. Regardless of whether maintenance of the image forming apparatus is included or not in the subscription service, the firmware installed in the image forming apparatus is preferably the latest version at the start of use. Thus, in such a subscription service, once the user sets the image forming apparatus in the user's house, office, or the like, whether the firmware installed in the image forming apparatus is the latest version is preferably confirmed without delay. In a case where the firmware is not the latest version, the firmware is preferably updated to the latest version. In particular, it is preferable to update the firmware to the latest version with as little hassle to the user as possible. After the user sets the image forming apparatus, the subscription service needs to be activated. Thus, the initial setup executed after the user sets the image forming apparatus includes update of the firmware and activation of the subscription service.

The activation of the subscription service is performed by the image forming apparatus and a subscription service server cooperating with each other, and requires communication between the two apparatuses. Moreover, this communication requires the firmware of the image forming apparatus to be run. For this reason, in a case where the firmware is updated while the subscription service is activated, a communication failure may occur and the subscription service may fail to be properly activated. Japanese Patent Laid-Open No. 2022-85782 (hereinafter referred to as Document 1) discloses a technique in which, in a case where an image forming apparatus remains in a state of not receiving an operation from a user for a predetermined time, the image forming apparatus queries a server about whether update data is available and, if update data is available, downloads the update data from the server and installs it. However, the technique disclosed in Document 1 does not take communication during initial setup into account.

SUMMARY OF THE DISCLOSURE

An embodiment of the present disclosure provides an information processing apparatus comprising: one or more memories storing instructions, and one or more processors capable of executing the instructions causing the information processing apparatus to: restrict a process related to updating predetermined software of the information processing apparatus in a case where initial setup of a subscription service involving communication with a server has not been completed; and execute the process related to updating the predetermined software in a case where the initial setup is completed and update information on update of the predetermined software is received.

Further features of the present disclosure will become apparent from the following description of exemplary embodiments with reference to the attached drawings.

BRIEF DESCRIPTION OF THE DRAWINGS

FIGS. 28A to 28C are diagrams illustrating screens displayed on the image forming apparatus.

DESCRIPTION OF THE EMBODIMENTS

Preferred embodiments of the present disclosure will be specifically described with reference to the accompanying drawings. Note that the following embodiments do not limit the present invention according to the claims, and not all the combinations of the features described in these embodiments are necessarily essential for the solution provided by the present disclosure.

Common Embodiment

Figure 1:
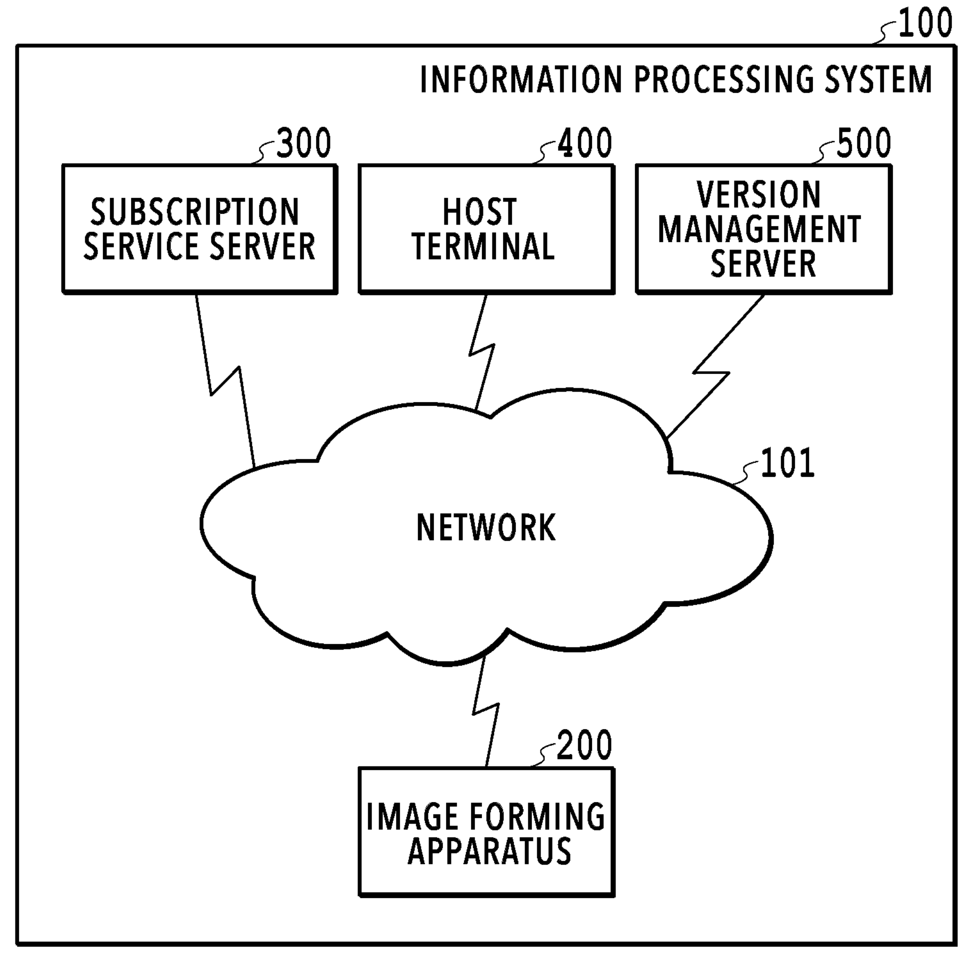
FIG. 1 is a block diagram illustrating an information processing system.

A system configuration in a common embodiment according to the present disclosure will be described with reference to FIG. 1. FIG. 1 is a schematic diagram illustrating an entire system configuration of an information processing system in the present embodiment. An information processing system 100 has a network 101, and an image forming apparatus 200, a subscription service server 300, a host terminal 400, and a version management server 500 that communicate with one another through the network 101. The host terminal 400 is a communication apparatus capable of connecting to the network and communicating with the subscription service server 300. The term "a communication apparatus" refers to, for example, a smartphone or a personal computer. In the present embodiment, the image forming apparatus 200 communicates with the host terminal 400 through the network 101, but another configuration may be employed. For example, the image forming apparatus 200 and the host terminal 400 may communicate with each other through a universal serial bus (USB) cable instead of the network 101.

Figure 2:
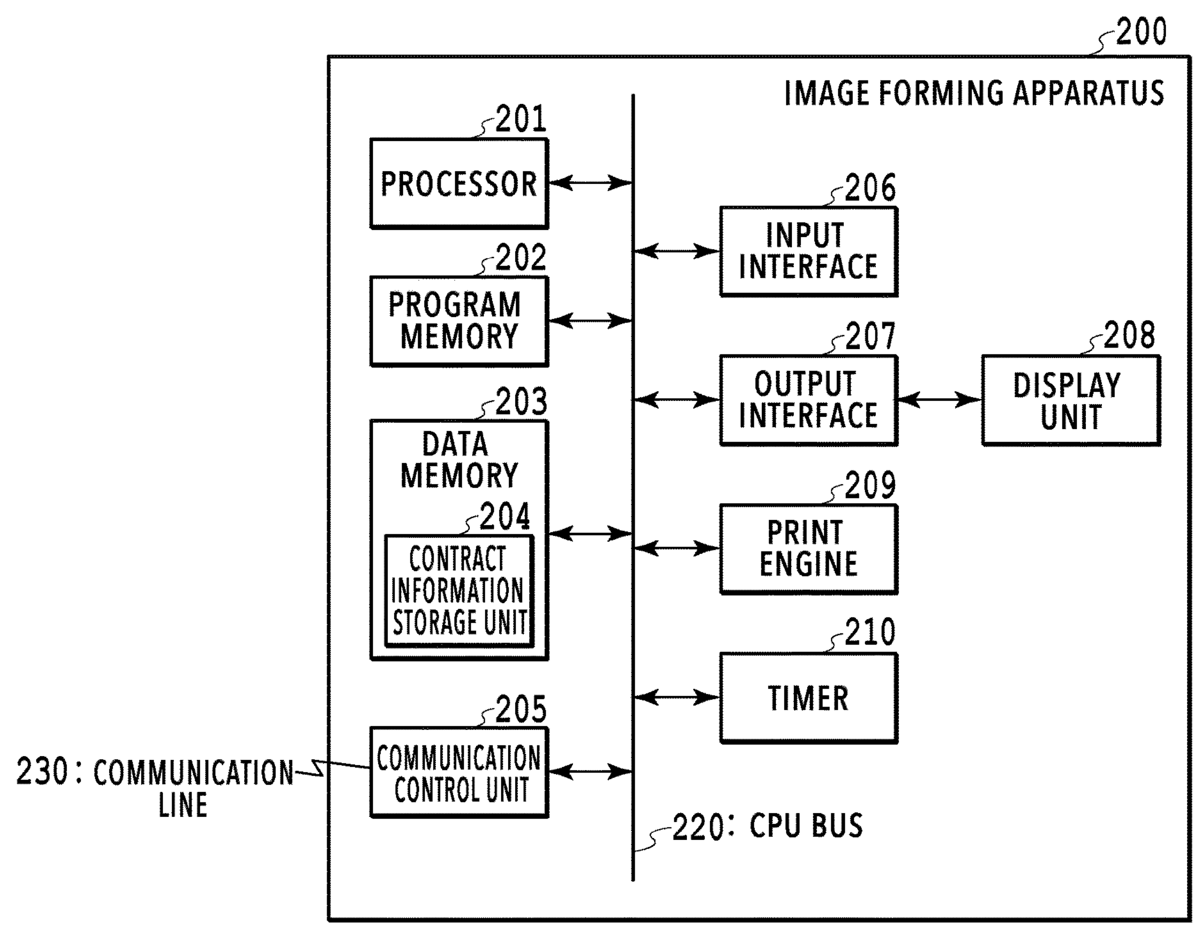
FIG. 2 is a block diagram illustrating a configuration of an image forming apparatus.

FIG. 2 is a diagram illustrating a configuration of the image forming apparatus 200 in the present embodiment. The image forming apparatus 200 has a processor 201, a program memory 202, a data memory 203, and a contract information storage unit 204. The image forming apparatus 200 also has a communication control unit 205, an input interface 206, an output interface 207, a display unit 208, a print engine 209, and a timer 210.

The processor 201 is a system control unit and comprehensively controls the image forming apparatus 200.

The program memory 202 stores control programs and a built-in operating system program to be executed by the processor 201 and the like.

The data memory 203 stores program control variables and the like, and various work buffer areas to be used in processing by the print engine 209 are provided. The data memory 203 includes the contract information storage unit 204. The contract information storage unit 204 holds subscription service contract information which the image forming apparatus 200 received via the communication control unit 205. In the present embodiment, the subscription service contract information held in the contract information storage unit 204 represents any one of a subscription service contract state, a consumable subscription service contract state, or an apparatus-included subscription service contract state. The data memory 203 also holds the results of processes by the image forming apparatus 200. The results of the processes include whether update is available or not available that is based on update information the image forming apparatus 200 received from the version management server 500 via the communication control unit 205. Other information and flags to be held will be set forth in the description of processes to be given using flowcharts.

The communication control unit 205 controls data communication with an external entity through a communication line 230.

The input interface 206 is an interface that receives data inputs and operation instructions from the user and includes a physical keyboard and buttons, a touch panel, or the like. The configuration may be such that the output interface 207 to be described below and the input interface 206 are configured as an integrated component, and this integrated component outputs screens and receives user operations. The output interface 207 is an interface that performs control for display of data on the display unit 208 and notification of the status of the image forming apparatus 200.

The display unit 208 includes light emitting diodes (LEDs), a liquid crystal display (LCD), or the like, and displays data and notifies the user of the status of the image forming apparatus 200. A software keyboard including keys such as number input keys, mode setting keys, an enter key, a cancel key, and a power key may be installed in the display unit 208 to receive user inputs via the display unit 208.

The print engine 209 forms an image on a print medium, such as paper, by using a printing material, such as an ink, based on information saved in the data memory 203 and a received print job, and outputs the print result.

The above components 201 to 207 and 209 are connected to one another through a bus 220 managed by the processor 201.

Next, a subscription service which is one of charged services provided by the information processing system 100 will be generally described. The subscription service is generally a service that provides a printing environment characterized in that the user is monthly charged a fixed amount of money until printing a predetermined number of pages corresponding to the monthly plan fee. After the predetermined number is exceeded, the user can switch to a higher plan or the plan switches to a pay-as-you-go plan in which the amount of money to be charged increases on a page-by-page basis, for example. In a case where the user applies for the subscription service, the service provider delivers the image forming apparatus 200 including consumables to the user. The image forming apparatus 200 receives subscription service joining information from the subscription service server 300 through the communication line 230. Each time the image forming apparatus 200 performs printing, it creates a job log indicating the number of pages printed in the job, the amounts of the consumables consumed in the job, and so on, and sends the job log to the subscription service server 300. Based on the information of the job log, the subscription service server 300, for example, figures out the number of pages printed in each month and the ratios of the consumables consumed by the user, and delivers any of the consumables when the remaining amount of that consumable runs low. In order to provide the subscription service in this system configuration, it is necessary to maintain an environment in which the image forming apparatus 200 is connected to the network and regularly sends a job log to the subscription service server 300. Thus, the image forming apparatus 200 stops functioning in a case where it is not connected to the network. In the present embodiment, in a case where the image forming apparatus 200 receives subscription service joining information from the subscription service server 300 through the communication line 230, this operation will be described as "subscription service activation process" or simply as "activation process." Moreover, in a case where the image forming apparatus 200 determines to be "in a state of having properly contracted for the subscription service" by the subscription service activation process, this operation or state will be described as "completion subscription service activation" or "subscription service activation completed" or simply as "completion of activation" or "activation completed."

In the following, operations of the image forming apparatus 200, the subscription service server 300, the host terminal 400, and the version management server 500 will be described. Each step to be executed by the image forming apparatus 200 is implemented by causing the processor 201 included in the image forming apparatus 200 to read and execute a program stored in the program memory 202. Each step to be executed by the subscription service server 300 is implemented by causing a processor (not illustrated) included in the subscription service server 300 to read and execute a program stored in a program memory (not illustrated) included in the subscription service server 300. The same applies to the host terminal 400 and the version management server 500 as well. Each of these apparatuses can be considered an information processing apparatus since each of them reads and executes a program stored in a program memory.

Figure 3:
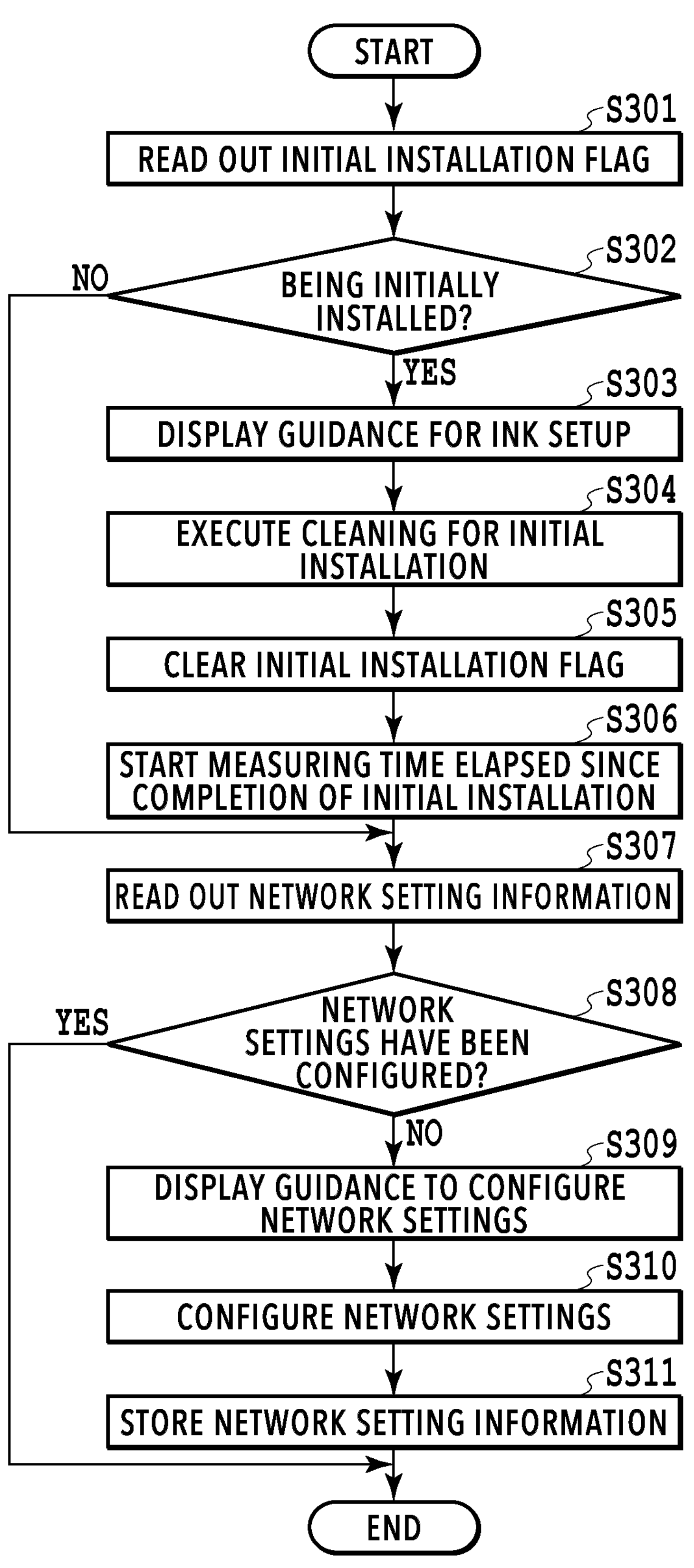
FIG. 3 is a flowchart illustrating operation of the image forming apparatus in initial installation.

FIG. 3 is a flowchart illustrating a flow of a process performed in initial installation in the common embodiment according to the present disclosure. The process illustrated in this flowchart starts in response to execution of software power-on in a case where the image forming apparatus 200 detects that the user has pressed the power button of the display unit 208. The software power-on refers to an operation in which the image forming apparatus 200 in a state where it is connected to a power source and its hardware is powered on but its software is not operating, boots the software in response to the user pressing the power button of the display unit 208. First, in step S301 after the execution of the software power-on, the image forming apparatus 200 reads out the value of an initial installation flag saved in the data memory 203. In the following, "step S_" will be abbreviated as "S_". The flag value is information indicating whether initial installation is being performed now. Specifically, the flag holds either a value "ON" indicating that the image forming apparatus 200 is being initially installed (booted for the first time) or a value "OFF" indicating that the image forming apparatus 200 is not being initially installed (booted for the second or subsequent time). Then, in S302, the image forming apparatus 200 performs branching of the process according to the read flag value. Specifically, if the value of the initial installation flag is "ON," the image forming apparatus 200 determines that it is being initially installed, and advances the process to S303 to start boot control dedicated for the initial installation. On the other hand, if the value of the initial installation flag is "OFF," the image forming apparatus 200 determines that the initial installation has been completed, and advances the process to S307. In S303, the image forming apparatus 200 displays guidance prompting the user to perform initial ink setup for the print engine 209 on the display unit 208. Then, in S304, the image forming apparatus 200 executes a process necessary for the initial installation such as cleaning of the apparatus. S303 and S304 are processes for the initial installation. After completing the process is S305, in which the image forming apparatus 200 clears the value of the initial installation flag (updates the value saved in the data memory 203 to "OFF"). In this way, the image forming apparatus 200 will execute normal boot control on the next or subsequent software power-on. In the present embodiment, the image forming apparatus 200 uses the value of the initial installation flag (ON or OFF) to execute the branching process in S302, but may use information other than the flag.

In S306, the image forming apparatus 200 starts measuring the time elapsed since the completion of the initial installation. Specifically, the image forming apparatus 200 resets a timer for measuring the time elapsed since the completion of the initial installation and then causes the timer to start counting time.

Then, in S307, the image forming apparatus 200 reads out network setting information saved in the data memory 203. The value of this information is setting information for the image forming apparatus 200 to connect to the network 101 via the communication control unit 205. By connecting to the network 101 with this setting information, the image forming apparatus 200 can communicate with the subscription service server 300 and the version management server 500 through the network 101. Then, in S308, the image forming apparatus 200 performs branching of the process according to the content of the read setting information. Specifically, if the network setting information indicates that the network settings have been configured and the image forming apparatus 200 can connect to the network setting information 101, the image forming apparatus 200 determines that the network settings have been configured, and terminates the process illustrated in the flowchart. On the other hand, if the network setting information indicates that the network settings have not been configured and the image forming apparatus 200 cannot connect to the network setting information 101, the image forming apparatus 200 determines that the network settings have not been configured, and advances the process to S309. In S309, the image forming apparatus 200 displays guidance prompting the user to configure the network settings on the display unit 208. In a case where the user configures the network settings, the image forming apparatus 200 configures the network settings in S310. In this step, following the guidance displayed on the display unit 208, the user inputs network settings into the image forming apparatus 200 with the input interface 206. The user inputs network setting information into the image forming apparatus 200 with the input interface 206. Then, in S311, the image forming apparatus 200 stores the network setting information (saves setting information for connecting to the network 101 in the data memory 203). The image forming apparatus 200 can now communicate with the subscription service server 300 and the version management server 500 through the network 101. In the present embodiment, the user uses the input interface 206 of the image forming apparatus 200 to configure the network settings in S310, but another configuration may be employed. For example, the user may input network setting information to the host terminal 400 connected to the image forming apparatus 200 via the communication control unit 205. In this case, the host terminal 400 sends the network setting information input by the user to the image forming apparatus 200, and the image forming apparatus 200 in turn stores the received network setting information (saves setting information for connecting to the network 101 in the data memory 203). The image forming apparatus 200 may display the network setting guidance in S309 only if determining in S302 that the image forming apparatus 200 is being initially installed. In other words, the image forming apparatus 200 does not have to display the network setting guidance in S309 if image forming apparatus 200 has not just been initially installed (if booted for the second or subsequent time). This is because, in a case where the user has not configured the network settings in the initial installation, the operability, for example, may be better for the user to refer to the instruction manual or use the host terminal 400 to configure the network settings of the image forming apparatus 200. In particular, with a configuration having low display performance, such as a case where the display unit 208 includes only LEDs, the ease of operation on the image forming apparatus 200 can be low. In the case of such a configuration, the image forming apparatus 200 may not display the network setting guidance each time software power-on is performed because the operability is assumed to be higher if the image forming apparatus 200 does not do so. In the present embodiment, the network setting guidance is always displayed unless otherwise noted.

Next, a flow of a process in a case of contracting for a subscription service in the present disclosure will be described using FIG. 4. The process illustrated in the flowchart starts after performing the processes for initial installation in FIG. 3. Specifically, the process starts in a state where the processes for initial installation of the image forming apparatus 200 and the network setting configuration have been completed.

In S401, the host terminal 400 accepts a subscription service contract process through a user operation. Then, in S402, the host terminal 400 sends subscription service contract information to the subscription service server 300. The subscription service contract information sent in S402 contains pieces of information such as user information, identification information of the image forming apparatus 200 to be used in the subscription service, the subscription plan to be contracted for. In S403, the subscription service server 300 registers contractee user and information on the image forming apparatus 200 based on the received contract information. After registering the contract information, the subscription service server 300 sends an instruction to activate the subscription service to the image forming apparatus 200 in S404.

Next, a process in a case where the image forming apparatus 200 activates the subscription service will be described. In S405, the image forming apparatus 200 performs a process of determining whether it has received the instruction to activate the subscription service from the subscription service server 300. If the image forming apparatus 200 has not received the instruction to activate the subscription service in S405, the image forming apparatus 200 terminates the process illustrated in the flowchart. That is, the image forming apparatus 200 terminates the process without activating the subscription service. If the image forming apparatus 200 has received the instruction to activate the subscription service in S405, the image forming apparatus 200 activates the subscription service in S406. In this step, the image forming apparatus 200 updates a parameter held in the contract information storage unit 204 to a parameter in the subscription service contract information received in S405. In the present embodiment, the image forming apparatus 200 receives the subscription service contract information directly from the subscription service server 300 but may receive it through the host terminal 400. In this case, the host terminal 400 receives the subscription service contract information from the subscription service server 300, and the image forming apparatus 200 receives the service contract information from software or an application on the host terminal 400. In S406, the image forming apparatus 200 stores "activation completed" for the subscription service at the same time. Specifically, the image forming apparatus 200 saves a flag indicating "activation completed" for the subscription service in the data memory 203. While the image forming apparatus 200 saves the flag indicating "activation completed" for the subscription service in the data memory 203 in the above, the image forming apparatus 200 may be configured to hold the flag in the contract information storage unit 204 instead of in the data memory 203, and determine whether the subscription service is "activation completed" based on whether the flag is saved in the contract information storage unit 204. Note that, in the case where the image forming apparatus 200 saves the flag indicating "activation completed" in the data memory 203, it means, for example, to write data being a value indicating "activation completed" to a referable area in the data memory 203 prepared for the flag indicating "activation completed." In the following description, to store "A" means to save a flag indicating "A" in the data memory 203. This means, for example, to write a flag holding a value indicating "A" to a referable area in the data memory 203 prepared for a flag indicating "A" or indicating not "A." Moreover, to confirm whether "A" has been stored means, for example, to confirm whether the flag holding the value indicating "A" is written in the referable area in the data memory 203 prepared for the flag indicating "A" or indicating not "A."

In S407, the image forming apparatus 200 determines whether the subscription service contract information held in the contract information storage unit 204 represents the apparatus-included subscription service contract state (a subscription service contract state covering the apparatus and consumables). If determining that the subscription service contract information represents the apparatus-included subscription service contract state, the image forming apparatus 200 advances the process to S408. If determining that the subscription service contract information does not represent the apparatus-included subscription service contract state, the image forming apparatus 200 advances the process to S409. In S408, the image forming apparatus 200 indicate that the activation of the apparatus-included subscription service has been completed on the display unit 208.

In S409, the image forming apparatus 200 determines whether the subscription service contract information represents the consumable subscription service contract state (a subscription service covering only consumables). If determining in S409 that the subscription service contract information does not represent the consumable subscription service contract state, the image forming apparatus 200 terminates the process without doing anything. On the other hand, if determining that the subscription service contract information represents the consumable subscription service contract state, the image forming apparatus 200 advances the process to S410. In S410, the image forming apparatus 200 indicate that the activation of the consumable subscription service has been completed on the display unit 208. In the following, simply "activation" or "activation of a subscription service" means activation of the apparatus-included subscription service or the consumable subscription service.

Figure 4:
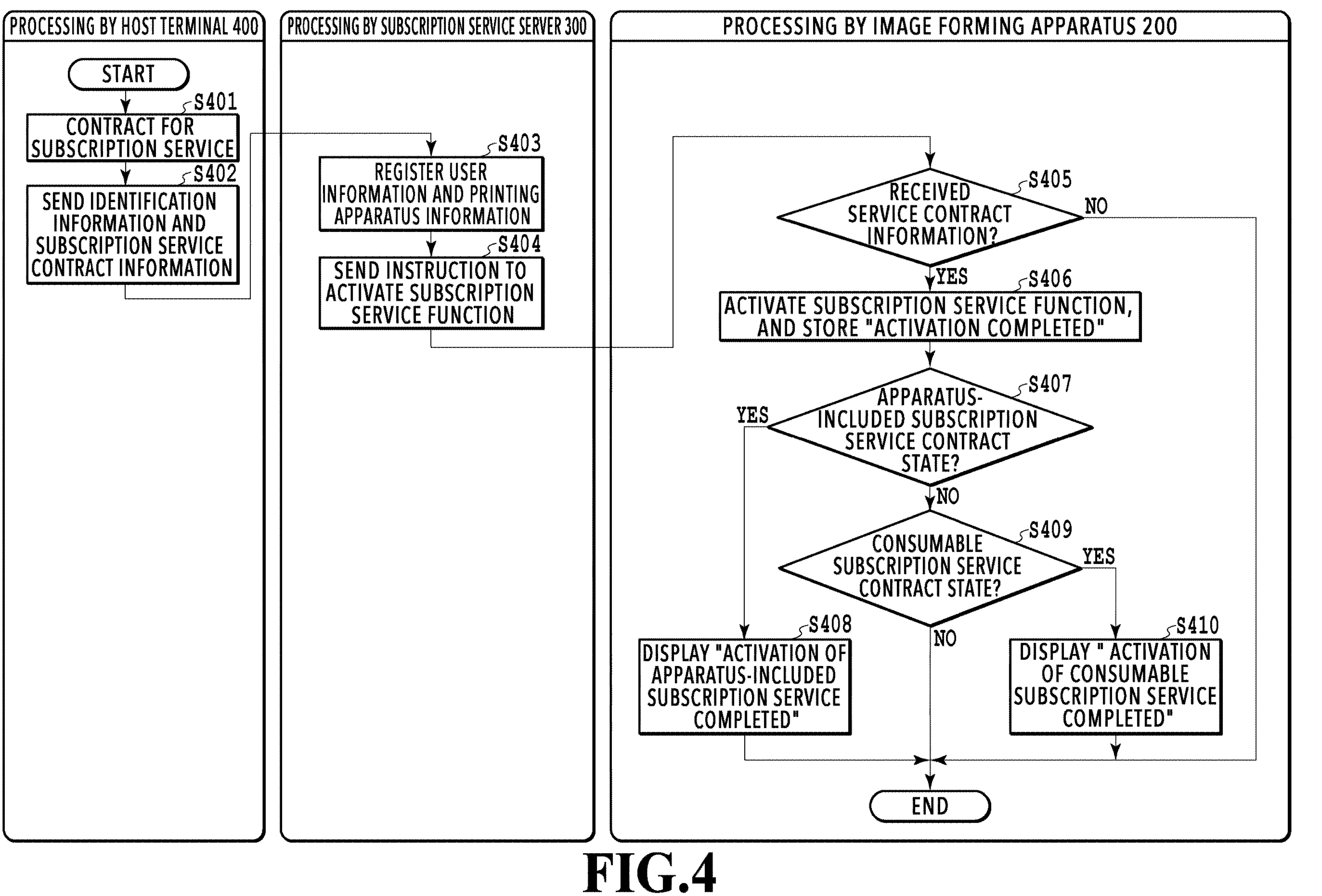
FIG. 4 is a flowchart of activation of a subscription service for the image forming apparatus in the information processing system.

In S408 and S410 in FIG. 4, the image forming apparatus 200 indicates the completion of the activation by displaying an activation completion confirmation screen 2801 as illustrated in FIG. 28A on the display unit 208 of the image forming apparatus 200. In a case where the user presses an "OK" button 2802 in this activation completion confirmation screen 2801, the image forming apparatus 200 deletes the activation completion confirmation screen 2801. In the present embodiment, the same screen is displayed in S408 and S410, but the configuration may be such that the screen to be displayed is switched between the two steps.

In the present configuration, the output interface 207 and the input interface 206 are configured as an integrated component, and this integrated component outputs screens and receives user operations. Alternatively, the configuration may be such that the physical keys and buttons provided on the input interface 206 receive user operations.

Figure 5:
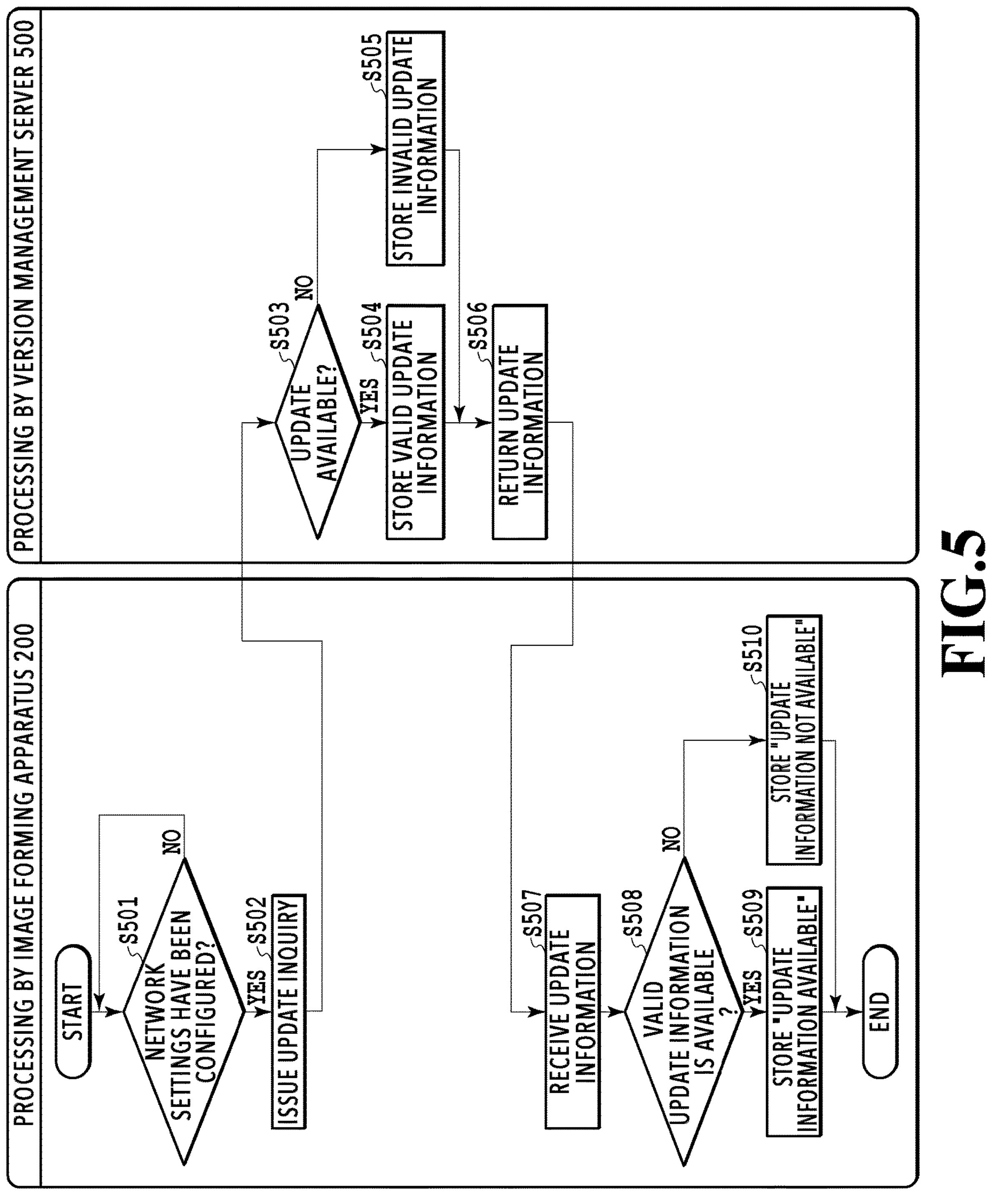
FIG. 5 is a flowchart of an operation of storing a flag indicating whether an update is available by the image forming apparatus.

Next, flows of processes for firmware update in the present disclosure will be described using FIGS. 5, 6, and 7. Note that the process illustrated in FIG. 4 and the processes illustrated in FIGS. 5, 6, and 7 each start after completing the process illustrated in FIG. 3. Based on this, the first to eighth embodiment to be described later are implemented by partly modifying these processes or adding a process(es).

The processes illustrated in FIGS. 5, 6, and 7 generally differ from one another as follows. In the process illustrated in FIG. 5, the image forming apparatus 200 only receives update information from the version management server 500 and then stores information indicating whether update information is available or not available. In the process illustrated in FIG. 6, the image forming apparatus 200 receives update information from the version management server 500 and then queries the user about whether to permit scheduled execution of update. In the process illustrated in FIG. 7, the image forming apparatus 200 receives update information from the version management server 500 and then queries the user about whether to permit immediate execution of update. In sum, the processes illustrated in FIGS. 5 and 6 do not involve execution of update while the process illustrated in FIG. 7 involves execution of update.

As described above, the processes illustrated in FIGS. 5, 6, and 7 differ from one another in the information to be stored and whether to immediately execute update, but which one of FIGS. 5, 6, and 7 to execute in which use case varies depending on the embodiment. The present embodiment will be described using the flowchart of FIG. 5. Since FIGS. 5, 6, and 7 share the same processing and concept in a major part, the processes in FIGS. 6 and 7 will also be described in the present embodiment in order to deepen understanding of the embodiment.

First, a description will be given using FIG. 5. The process illustrated in the flowchart starts after performing the processes for initial installation in FIG. 3. Here, it is essential to configure the network settings in order for the image forming apparatus 200 to communicate with the version management server 500. Thus, the process illustrated in FIG. 5 also takes into account a case of having skipped configuring the network settings in FIG. 3.

In S501, the image forming apparatus 200 determines whether the network settings have been configured. The image forming apparatus 200 may make this determination based on whether setting information for connecting to the network 101 is saved in the data memory 203, as in S309 in FIG. 3. The image forming apparatus 200 may also make the determination based on whether it can communicate with the version management server 500. If determining in S501 that the network settings have not been configured, the image forming apparatus 200 waits until the network settings are configured by repeating S501. The image forming apparatus 200 may terminate the process illustrated in the flowchart if determining that the network settings have not been configured. On the other hand, if determining in S501 that the network settings have been configured, the image forming apparatus 200 issues an update inquiry to the version management server 500 in S502. In response to receiving the update inquiry from the image forming apparatus 200, the version management server 500 determines whether an update is available in S503. The image forming apparatus 200 determines whether an update is available based on the version of the firmware held in the image forming apparatus 200 and the version of the firmware held in the version management server 500. Specifically, the version management server 500 determines that an update is available in a case where the version of the firmware held in the version management server 500 is later than the version of the firmware held in the image forming apparatus 200. If determining that there is an update available in S503, the version management server 500 advances the process to S504. On the other hand, if determining that no update is available in S503, the version management server 500 advances the process to S505. In S504, the version management server 500 stores valid update information as update information to be returned to the image forming apparatus 200. In S505, the version management server 500 stores invalid update information (e.g., NULL) as update information to be returned to the image forming apparatus 200. Then, in S506, the version management server 500 returns the update information stored in S504 or S505 to the image forming apparatus 200. In S507, the image forming apparatus 200 receives the update information sent from the version management server 500. Subsequently, in S508, the image forming apparatus 200 determines whether valid update information is available. If valid update information is available, the image forming apparatus 200 advances the process to S509. On the other hand, if no valid update information is available, the image forming apparatus 200 advances the process to S510. Here, in the determination of whether valid update information is available, the image forming apparatus 200 determines that valid update information is available in a case where the version management server 500 has stored the valid update information in S504. In the present embodiment, the image forming apparatus 200 determines that valid update information is available in a case where the valid update information stored in S504 is received in S507, but the present embodiment is not limited to this case.

In another example, the version management server 500 includes the program version of the latest firmware in the update information to be stored in S504. In this case, the image forming apparatus 200 compares the program version included in the update information received from the version management server 500 with the program version of the firmware installed in the image forming apparatus 200. The image forming apparatus 200 may determine that valid update information is available only in a case where the program version included in the received update information is later than the program version of the firmware installed in the image forming apparatus 200.

In still another example, in S502, the image forming apparatus 200 may issue the update inquiry to the version management server 500 while also notifying the version management server 500 with the program version of the firmware installed in the image forming apparatus 200. In this case, in S503, the version management server 500 compares the program version received from the image forming apparatus 200 with the program version of the latest firmware held in the version management server 500. The version management server 500 may determine that valid update information is available in S503 only in a case where the comparison result indicates that the program version of the latest firmware held in the version management server 500 is later than the received program version.

Next, a description will be given of the processing in the case where the image forming apparatus 200 has determined that valid update information is available in S508 and advanced the process to S509. In S509, the image forming apparatus 200 stores "update information available." Specifically, the image forming apparatus 200 saves a flag indicating "update information available" in the data memory 203. On the other hand, if advancing the process to S510, the image forming apparatus 200 stores "update information not available" in S510. Specifically, the image forming apparatus 200 saves a flag indicating "update information not available" in the data memory 203.

Next, a description will be given using FIG. 6. The processes of S601 to S608 in FIG. 6 are similar to the processes of S501 to S508 in FIG. 5, and overlapping description thereof is therefore omitted. If determining in S608 that valid update information is available, the image forming apparatus 200 advances the process to S609. In S609, the image forming apparatus 200 stores "update information available," as in S509 in FIG. 5. Then, in S610, the image forming apparatus 200 displays a screen for querying the user about whether to permit scheduled execution of update on the display unit 208. Specifically, the image forming apparatus 200 queries the user about whether to schedule execution of update, and waits for the user to make a choice. In S611, the image forming apparatus 200 lets the process branch according to the user's choice. If the user selects "schedule update" on the input interface 206, the image forming apparatus 200 advances the process to S612. On the other hand, if the user selects "do not schedule update" on the input interface 206, the image forming apparatus 200 advances the process to S613. In S612, the image forming apparatus 200 stores "execute scheduled update." Specifically, the image forming apparatus 200 saves a flag indicating "execute scheduled update" in the data memory 203. On the other hand, if advancing the process to S613, the image forming apparatus 200 stores "do not schedule execution of update." Specifically, the image forming apparatus 200 saves a flag indicating "do not schedule execution of update" in the data memory 203.

If determining in S608 that valid update information is not available, the image forming apparatus 200 advances the process to S614. In S614, the image forming apparatus 200 stores "update information not available," as in S510 in FIG. 5. Subsequently, in S615, the image forming apparatus 200 stores "do not schedule execution of update," as in S613.

Figure 6:
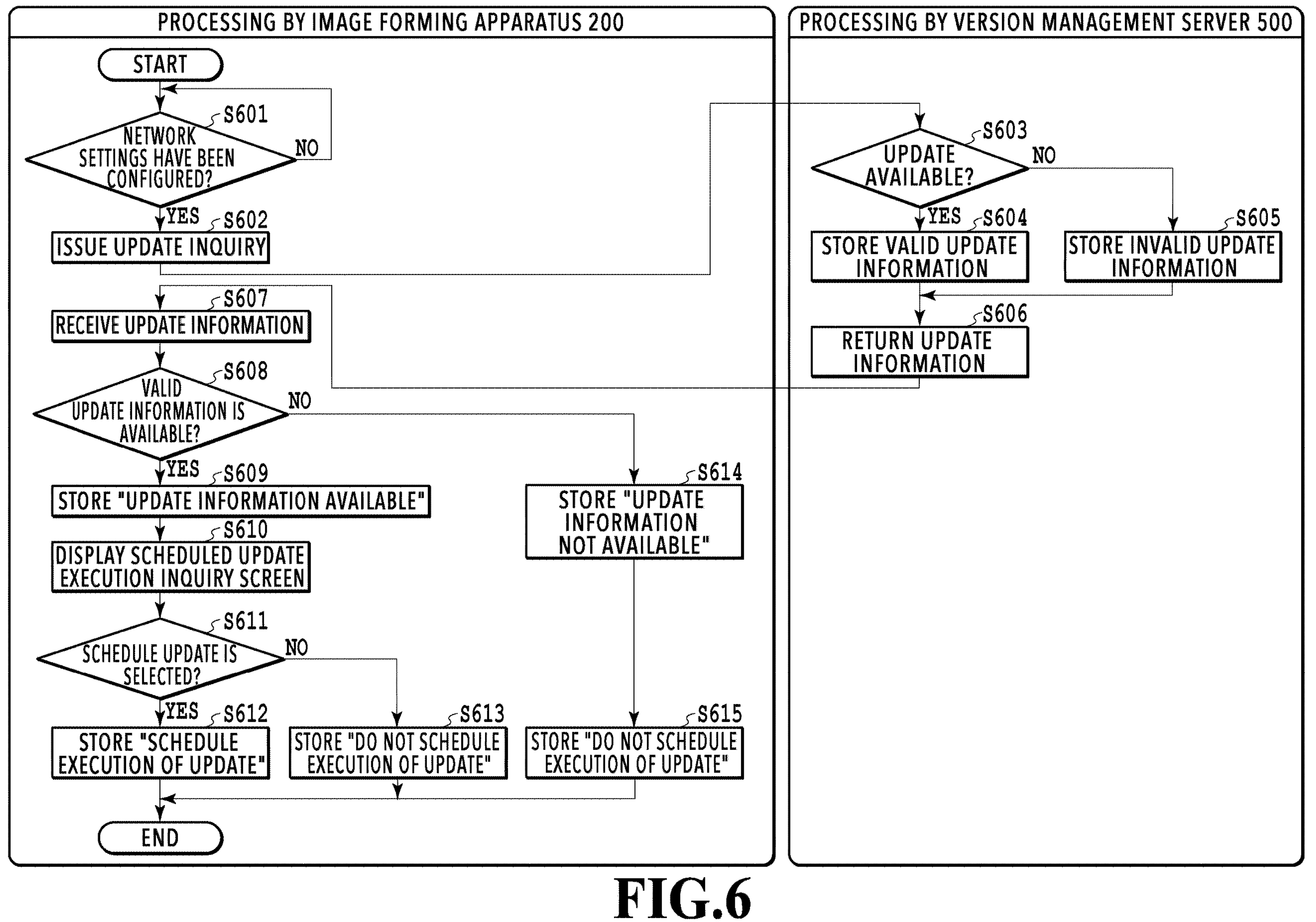
FIG. 6 is a flowchart of an operation of storing a flag indicating whether to permit scheduled execution of update by the image forming apparatus.

The image forming apparatus 200 presents a display for querying the user about whether to schedule execution of update in S610 described in FIG. 6 by displaying a scheduled update execution inquiry screen 2803 as illustrated in FIG. 28B on the display unit 208 of the image forming apparatus 200. In a case where the user presses a "Schedule Update" button 2804, the image forming apparatus 200 determines "YES" at the conditional branch of S611, and advances the process to S612. In a case where the user presses a "Dot Not Schedule Update" button 2805, the image forming apparatus 200 determines "NO" at the conditional branch of S611, and advances the process to S613. In the case where the user presses the button 2804 or 2805, the image forming apparatus 200 deletes the scheduled update execution inquiry screen 2803.

In the present configuration, the output interface 207 and the input interface 206 are configured as an integrated component, and this integrated component outputs screens and receives user operations. Alternatively, the configuration may be such that the physical keys and buttons provided on the input interface 206 receive user operations.

Next, a description will be given using FIG. 7. The processes of S701 to S709 in FIG. 7 are similar to the processes of S601 to S609 in FIG. 6, and overlapping description thereof is therefore omitted. Also, the process of S715 in FIG. 7 is similar to the process of S614 in FIG. 6, and overlapping description thereof is therefore omitted. In S710, the image forming apparatus 200 displays a screen for querying the user about whether to permit immediate execution of update on the display unit 208. Specifically, the image forming apparatus 200 queries the user about whether to immediately execute update, and waits for the user to make a choice. In S711, the image forming apparatus 200 lets the process branch according to the user's choice. If the user selects "update now" on the input interface 206, the image forming apparatus 200 advances the process to S712. On the other hand, if the user selects "do not update now"

on the input interface 206, the image forming apparatus 200 advances the process to S714. In S712, the image forming apparatus 200 updates the firmware. In the case of updating the firmware, the image forming apparatus 200 obtains the latest firmware data from the version management server 500 and uses the obtained latest firmware data to update the firmware. In the present embodiment, the update information and the latest firmware data are stored in the same server, but may be stored in separate servers. In the case of using separate servers, it is desirable that the update information be stored in the version management server 500 and contain information for accessing a server holding the latest firmware data. However, the configuration may be such that the update information is not provided with the information for accessing the server holding the latest firmware data. In this case, the configuration may be such that the information for accessing the server holding the latest firmware data is provided as fixed information so that the image forming apparatus 200 can be aware of the information for accessing the server holding the latest firmware data in advance. In still another configuration, the latest firmware data may be included in the update information. Note that the data size of the latest firmware data is larger than the data size of usual update information. Thus, with the configuration in which the latest firmware data is included in the update information, the size of the communication data will be large. Hence, a configuration in which the latest firmware data is not included in the update information is desirable.

Thereafter, in S713, the image forming apparatus 200 deletes the stored "update information available" since the firmware update has been completed. Specifically, the image forming apparatus 200 deletes the flag indicating "update information available" from the data memory 203. Thus, unless querying the version management server 500 and determining that update information is available again in the next or subsequent determination sequence, the image forming apparatus 200 will not execute unnecessary firmware update. If, on the other hand, advancing the process to S714, the image forming apparatus 200 does update the firmware and then terminates the process.

Figure 7:
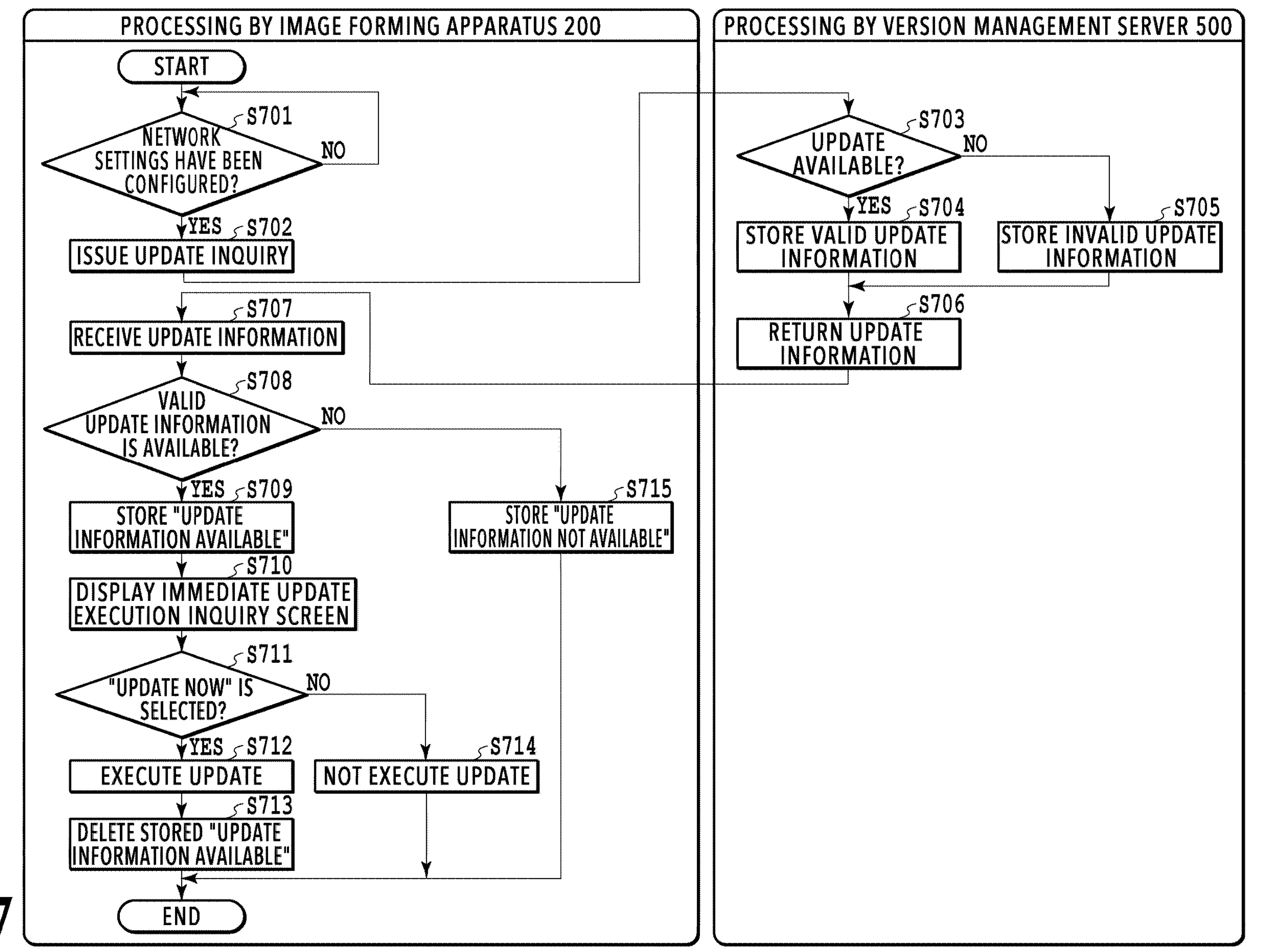
FIG. 7 is a flowchart of an operation of storing a flag indicating whether to permit immediate execution of update by the image forming apparatus.

The configuration may be such that, in S714 and S715 in FIG. 7, the image forming apparatus 200 stores "do not schedule execution of update," as in S613 in FIG. 6.

The image forming apparatus 200 presents a display for querying the user about whether to immediately execute update in S710 described in FIG. 7 by displaying an immediate update execution inquiry screen 2806 as illustrated in FIG. 28C on the display unit 208 of the image forming apparatus 200. In a case where the user presses an "Update Now" button 2807, the image forming apparatus 200 determines "YES" at the conditional branch of S711, and advances the process to S712. In a case where the user presses a "Do Not Update Now" button 2808, the image forming apparatus 200 determines "NO" at the conditional branch of S711, and advances the process to S714. In the case where the user presses the button 2807 or 2808, the image forming apparatus 200 deletes the immediate update execution inquiry screen 2806.

In the present configuration, the output interface 207 and the input interface 206 are configured as an integrated component, and this integrated component outputs screens and receives user operations. Alternatively, the configuration may be such that the physical keys and buttons provided on the input interface 206 receive user operations.

Next, the first to eighth embodiments will be described. First, each embodiment will be generally described.

In the first embodiment, even in a case where the image forming apparatus 200 determines that latest firmware is available before completion of activation of a subscription service, the image forming apparatus 200 does not query the user about whether to permit execution of firmware update at this point yet. Moreover, in a case where the image forming apparatus 200 has already determined that latest firmware is available when the activation of the subscription service is completed, then, the image forming apparatus 200 queries the user about whether to permit immediate execution of firmware update. In a case where the user selects "Update Now," then, the image forming apparatus 200 updates the firmware.

According to the first embodiment, the user is queried about whether to permit immediate execution of firmware update after completion of activation of a subscription service. In this way, the image forming apparatus 200 can avoid updating the firmware during the activation of the subscription service, which involves communication between the image forming apparatus 200 and the subscription service server 300.

In the second embodiment, like the first embodiment, the image forming apparatus 200 can determine that latest firmware is available before completion of activation of a subscription service. Moreover, in the case where the image forming apparatus 200 determines that latest firmware is available before the completion of the activation of the subscription service, then, the image forming apparatus 200 queries the user at this point about whether to permit scheduled execution of firmware update. In a case where the user selects "schedule update" before the completion of the activation of the subscription service, then, the image forming apparatus 200 will update the firmware after the completion of the activation of the subscription service.

According to the second embodiment, in a case where the user selects "schedule update" during activation of a subscription service, the firmware will be updated after the activation of the subscription service is completed. In this way, the image forming apparatus 200 can avoid updating the firmware during the activation of the subscription service, which involves communication between the image forming apparatus 200 and the subscription service server 300.

In the third embodiment, the image forming apparatus 200 writes a flag indicating "activation completed" to the data memory 203 for a subscription service after activation of the subscription service is completed. Moreover, in a case where the image forming apparatus 200 determines that latest firmware is available, then, the image forming apparatus 200 confirms whether the flag indicating "activation completed" has been written in the data memory 203 for the subscription service. In a case where the flag indicating "activation completed" has been written in the data memory 203 for the subscription service, then, the image forming apparatus 200 queries the user about whether to immediately update the firmware. In a case where the user selects "Update Now," then, the image forming apparatus 200 updates the firmware.

According to the third embodiment, in a case where latest firmware is detected to be available, the firmware is updated only if activation of a subscription service has been completed before the detection. In this way, the image forming apparatus 200 can avoid updating the firmware during the activation of the subscription service, which involves communication between the image forming apparatus 200 and the subscription service server 300.

In a partly modified version of the third embodiment, in a case where activation of a subscription service is completed, then, the image forming apparatus 200 writes a flag indicating "activation completed" to the data memory 203 for the subscription service. Moreover, in a case where the image forming apparatus 200 determines that latest firmware is available, then, the image forming apparatus 200 confirms whether the flag indicating "activation completed" has been written in the data memory 203 for the subscription service. If the flag indicating "activation completed" has not been written in the data memory 203 for the subscription service, the image forming apparatus 200 waits until the flag indicating "activation completed" is written to the data memory 203 for the subscription service. If the flag indicating "activation completed" has been written in the data memory 203 for the subscription service, then, the image forming apparatus 200 queries the user about whether to immediately update the firmware. In a case where the user selects "Update Now," then, the image forming apparatus 200 updates the firmware.

According to the partly modified version of the third embodiment, in a case where latest firmware is detected to be available, the firmware is updated only if activation of a subscription service has been completed before the detection or the activation of the subscription service is completed after the detection. In this way, the image forming apparatus 200 can avoid updating the firmware during the activation of the subscription service, which involves communication between the image forming apparatus 200 and the subscription service server 300.

The fourth embodiment is implemented by modifying the first embodiment so as to avoid immediately updating the firmware in a case where the host terminal 400 has not completed printer registration. Specifically, in a case where activation of a subscription service is completed, then, the image forming apparatus 200 confirms whether the host terminal 400 has already completed printer registration. If the host terminal 400 has already completed the printer registration, then, the image forming apparatus 200 confirms whether the latest firmware has been determined to be available. If the image forming apparatus 200 has already determined that latest firmware is available, then, the image forming apparatus 200 queries the user about whether to permit immediate execution of firmware update. In a case where the user selects "Update Now," then, the image forming apparatus 200 updates the firmware.

According to the fourth embodiment, the image forming apparatus 200 can avoid updating the firmware during activation of a subscription service, which involves communication between the image forming apparatus 200 and the subscription service server 300. The image forming apparatus 200 can also avoid updating the firmware during the registration of the image forming apparatus 200 in the host terminal 400, which involves communication between the image forming apparatus 200 and the host terminal 400.

The fifth embodiment is the second embodiment partly modified so as to avoid scheduled execution of firmware update when activation of a subscription service is completed in a case where the host terminal 400 is currently executing printer registration at this point. In the fifth embodiment, in a case where the image forming apparatus 200 determines that latest firmware is available before the completion of the activation of the subscription service, then, the image forming apparatus 200 queries the user whether to permit scheduled execution of firmware update. In a case where the activation of the subscription service is completed, then, the image forming apparatus 200 confirms whether the host terminal 400 is currently executing printer registration. If the host terminal 400 is not currently executing printer registration, then, the image forming apparatus 200 confirms whether the user has permitted the scheduled execution of firmware update. If the user has permitted the scheduled execution of firmware update, then, the image forming apparatus 200 updates the firmware.

According to the fifth embodiment, when activation of a subscription service is completed, the image forming apparatus 200 confirms whether the user has permitted scheduled execution of firmware update in a case where the host terminal 400 is not executing printer registration. In this way, the image forming apparatus 200 can avoid updating the firmware during the activation of the subscription service, which involves communication between the image forming apparatus 200 and the subscription service server 300. The image forming apparatus 200 can also avoid updating the firmware during the registration of the image forming apparatus 200 in the host terminal 400, which involves communication between the image forming apparatus 200 and the host terminal 400.

In the sixth embodiment, in a case where the image forming apparatus 200 receives a notification from the host terminal 400 indicating that registration of printer information has been completed, then, the image forming apparatus 200 determines whether activation of a subscription service has already been completed. If the activation of the subscription service has already been completed, then, the image forming apparatus 200 confirms whether latest firmware has already been determined to be available. If the image forming apparatus 200 has already determined that latest firmware is available, then, the image forming apparatus 200 queries the user about whether to permit immediate execution of firmware update. In a case where the user selects "Update Now," then, the image forming apparatus 200 updates the firmware.

According to the sixth embodiment, the image forming apparatus 200 can avoid updating the firmware during activation of a subscription service, which involves communication between the image forming apparatus 200 and the subscription service server 300. The image forming apparatus 200 can also avoid updating the firmware during the registration of the image forming apparatus 200 in the host terminal 400, which involves communication between the image forming apparatus 200 and the host terminal 400.

The seventh embodiment is the first embodiment partly modified so as to delay the timing of querying the user about whether to permit immediate execution of firmware update. Specifically, in a case where the image forming apparatus 200 has already determined that latest firmware is available when activation of a subscription service is completed, the image forming apparatus 200 waits until a predetermined time elapses after the completion of the processes for initial installation of the image forming apparatus 200. If the predetermined time elapses after the completion of the processes for initial installation of the image forming apparatus 200, then, the image forming apparatus 200 queries the user about whether to permit immediate execution of firmware update. In a case where the user selects "Update Now," then, the image forming apparatus 200 updates the firmware.

According to the seventh embodiment, as in the first embodiment, the image forming apparatus 200 can avoid updating the firmware during activation of a subscription service, which involves communication between the image forming apparatus 200 and the subscription service server 300. Also, the host terminal 400 registers the image forming apparatus 200 in the host terminal 400, which involves communication between the host terminal 400 and the image forming apparatus 200. The image forming apparatus 200 can avoid updating the firmware while the host terminal 400 is registering the image forming apparatus 200 even in a case where the host terminal 400 cannot notify the image forming apparatus 200 of the completion of the registration of the image forming apparatus 200.

The eighth embodiment is the first embodiment partly modified such that the apparatus to display the inquiry about whether to permit immediate execution of firmware update is switched from the image forming apparatus 200 to the host terminal 400 in a predetermined case. Specifically, in a case where the image forming apparatus 200 has already determined that latest firmware is available when activation of a subscription service is completed, then, the image forming apparatus 200 determines whether a predetermined time has elapsed since the completion of the processes for initial installation of the image forming apparatus 200. Then, if the predetermined time has not elapsed since the completion of the processes for initial installation of the image forming apparatus 200, the apparatus to display the inquiry about whether to permit immediate execution of firmware update and input the user's choice is changed to the host terminal 400. On the other hand, if the predetermined time has elapsed since the completion of the processes for initial installation of the image forming apparatus 200, the image forming apparatus 200 remains as the apparatus to display the inquiry about whether to permit immediate execution of firmware update and input the user's choice.

According to the eighth embodiment, as in the first embodiment, the image forming apparatus 200 can avoid updating the firmware during activation of a subscription service, which involves communication between the image forming apparatus 200 and the subscription service server 300. Also, if the predetermined time has not elapsed since the completion of the processes for initial installation of the image forming apparatus 200, the image forming apparatus 200 can start updating the firmware via the host terminal 400.

Next, the first through eighth embodiments will be described in detail.

First Embodiment

Figure 9:
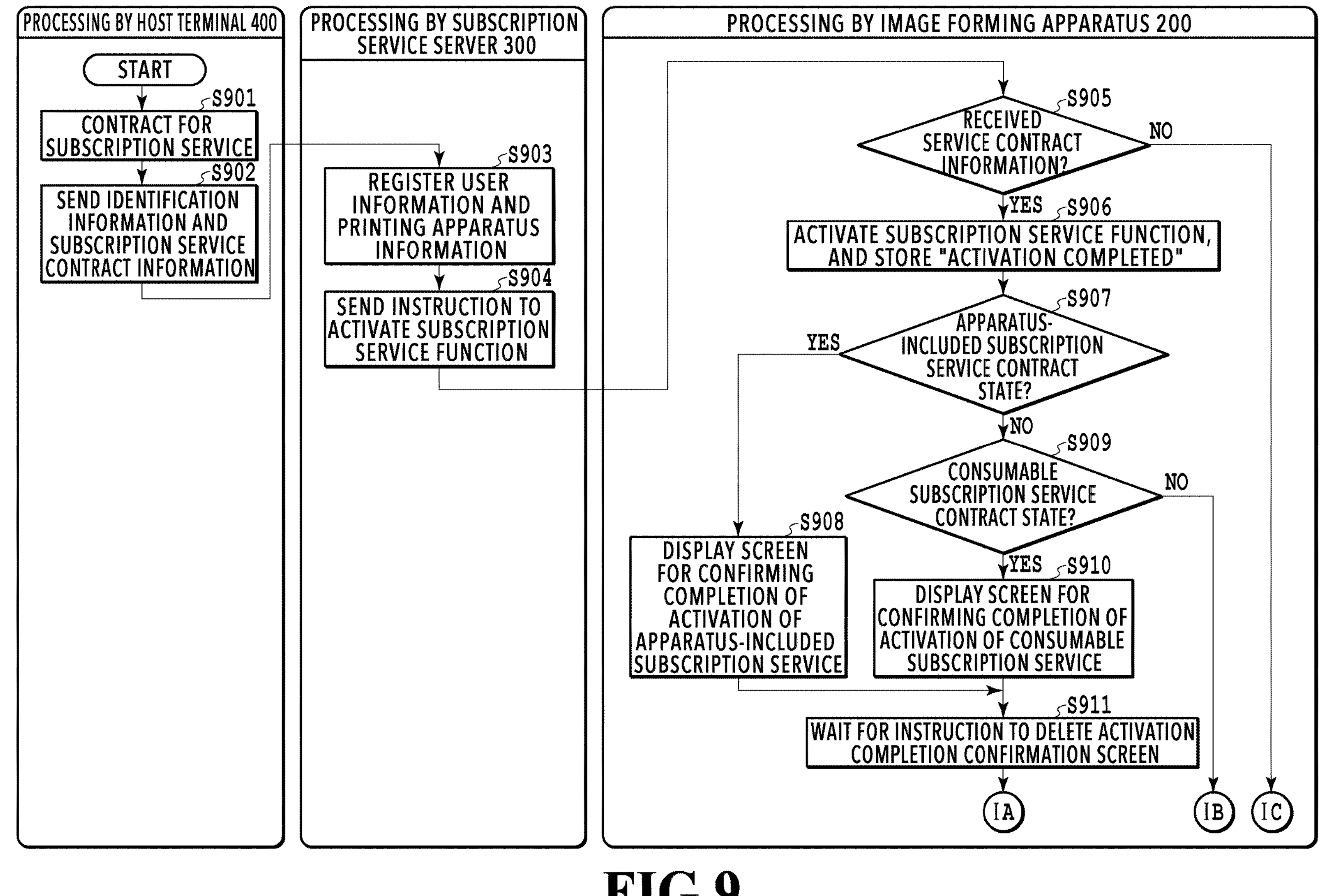
FIG. 9 is a first half of a flowchart illustrating main portions of operations of the host terminal, a subscription service server, and the image forming apparatus according to a first embodiment.
Figure 10:
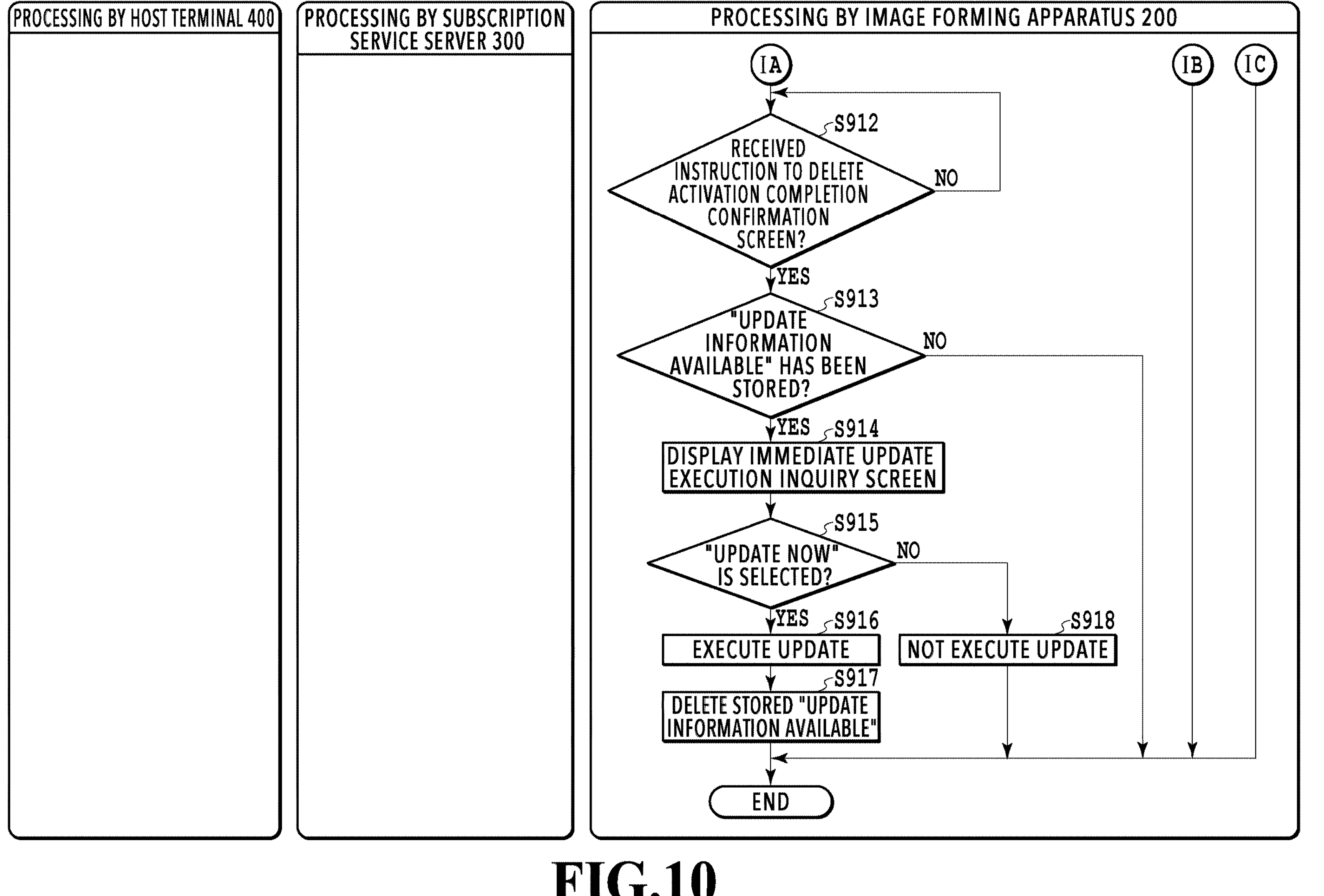
FIG. 10 is a second half of the flowchart illustrating the main portions of the operations of the host terminal, the subscription service server, and the image forming apparatus according to the first embodiment.

The process in the first embodiment will be described using FIGS. 9 and 10. The process illustrated in FIGS. 9 and 10 is a process combining a service registration process (activation process) for a subscription service and firmware update. The process in the present embodiment illustrated in FIGS. 9 and 10 is a combination of the subscription service activation process illustrated in FIG. 4 and an update process using the value "update information available" that is stored in the process illustrated in FIG. 5. Thus, in the present embodiment, the process illustrated in FIG. 5 and the process illustrated in FIGS. 9 and 10 are both executed after the process illustrated in FIG. 3. In the process illustrated in FIG. 5, in response to receiving valid update information from the version management server 500, the image forming apparatus 200 stores "update information available." In the process illustrated in FIGS. 9 and 10, after completing activation of a subscription service, the image forming apparatus 200 determines whether "update information available" is stored. If "update information available" is stored, the image forming apparatus 200 updates the firmware after receiving a permission to do so from the user.

Like the process illustrated in the flowchart of FIG. 4, the process illustrated in the flowcharts of FIGS. 9 and 10 starts after performing the processes for initial installation in FIG. 3. Specifically, the process starts in a state where the processes for initial installation of the image forming apparatus 200 and the network setting configuration have been completed. Steps executed in the process illustrated in the flowchart vary depending on whether the process in FIG. 5 has been performed before the start of the process illustrated in the flowchart. This means that the conditions to start the process illustrated in the flowchart of FIG. 5 and the conditions to start the process illustrated in the flowchart of FIGS. 9 and 10 are similar, and both processes are executed in parallel with each other. Hence, the control varies depending on the order of execution.

The processes of S901 to S910 in FIGS. 9 and 10 are similar to the processes of S401 to S410 in FIG. 4, and overlapping description thereof is therefore omitted.

After S908 or S910, the image forming apparatus 200 waits for the activation completion confirmation screen 2801 (see FIG. 28A), which indicates that the activation of the subscription service has been completed, to be deleted in S911 and S912. Specifically, the image forming apparatus 200 waits for the user to press the "OK" button 2802 in the activation completion confirmation screen 2801 displayed on the display unit 208, indicating that the activation of the subscription service has been completed. In S912, the image forming apparatus 200 lets the process branch according to the user's operation. If the user performs an operation on the input interface 206 to delete the activation completion confirmation screen 2801 indicating that the activation of the subscription service has been completed (pressing the "OK" button 2802), the image forming apparatus 200 advances the process to S913. On the other hand, if the user does not perform the operation on the input interface 206 to delete the screen indicating that the activation of the subscription service has been completed (pressing the "OK" button 2802), the image forming apparatus 200 repeats S912 to wait for the user to perform the operation.

In S913, the image forming apparatus 200 determines whether "update information available" has been stored. The image forming apparatus 200 determines that "update information available" has been stored in a case where the image forming apparatus 200 has executed step S509 of storing "update information available" (FIG. 5) before step S913. If determining in S913 that "update information available" has been stored, the image forming apparatus 200 advances the process to S914. On the other hand, if determining that "update information available" has not been stored, the image forming apparatus 200 terminates the process illustrated in the flowchart. S914 is a process of displaying a screen for querying the user about whether to permit immediate execution of update. The processes of S914 to S918 are similar to the processes of S710 to S714 illustrated in FIG. 7, and overlapping description thereof is therefore omitted.

The image forming apparatus 200 detects pressing of the "OK" button 2802 in the activation completion confirmation screen 2801 (FIG. 28A) by the user as the user's instruction to delete the activation completion confirmation screen 2801 in S911 and S912.

In the present configuration, the output interface 207 and the input interface 206 are configured as an integrated component, and this integrated component outputs screens and receives user operations. Alternatively, the configuration may be such that the physical keys and buttons provided on the input interface 206 receive user operations.

As described above, according to the present embodiment, it is possible to achieve the following. In a case where the image forming apparatus 200 has already stored information indicating that latest firmware is available when activation of a subscription service is completed, the image forming apparatus 200 can update the firmware following the completion of the activation of the subscription service. In this way, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Second Embodiment

In the second embodiment, like the first embodiment, the image forming apparatus 200 determines whether latest firmware is available before completion of activation of a subscription service. In the second embodiment, unlike the first embodiment, in a case where the image forming apparatus 200 determines that latest firmware is available before the completion of the activation of the subscription service, the image forming apparatus 200 queries the user about whether to permit execution of firmware update at this point. In a case where the user permits execution of firmware update before the completion of the activation of the subscription service, the image forming apparatus 200 will update the firmware after the completion of the activation of the subscription service.

Figure 11:
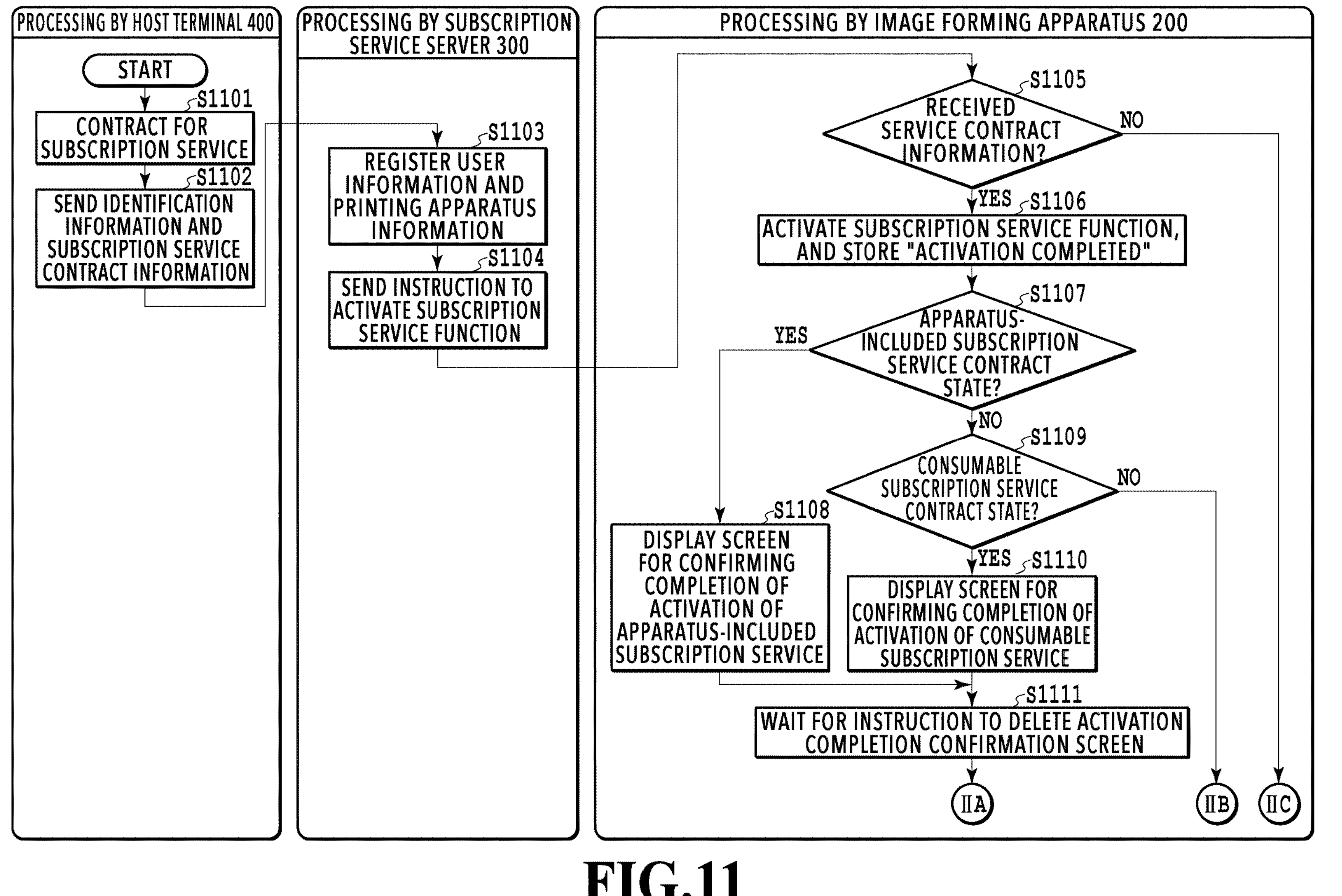
FIG. 11 is a first half of a flowchart illustrating main portions of operations of the host terminal, the subscription service server, and the image forming apparatus according to a second embodiment.
Figure 12:
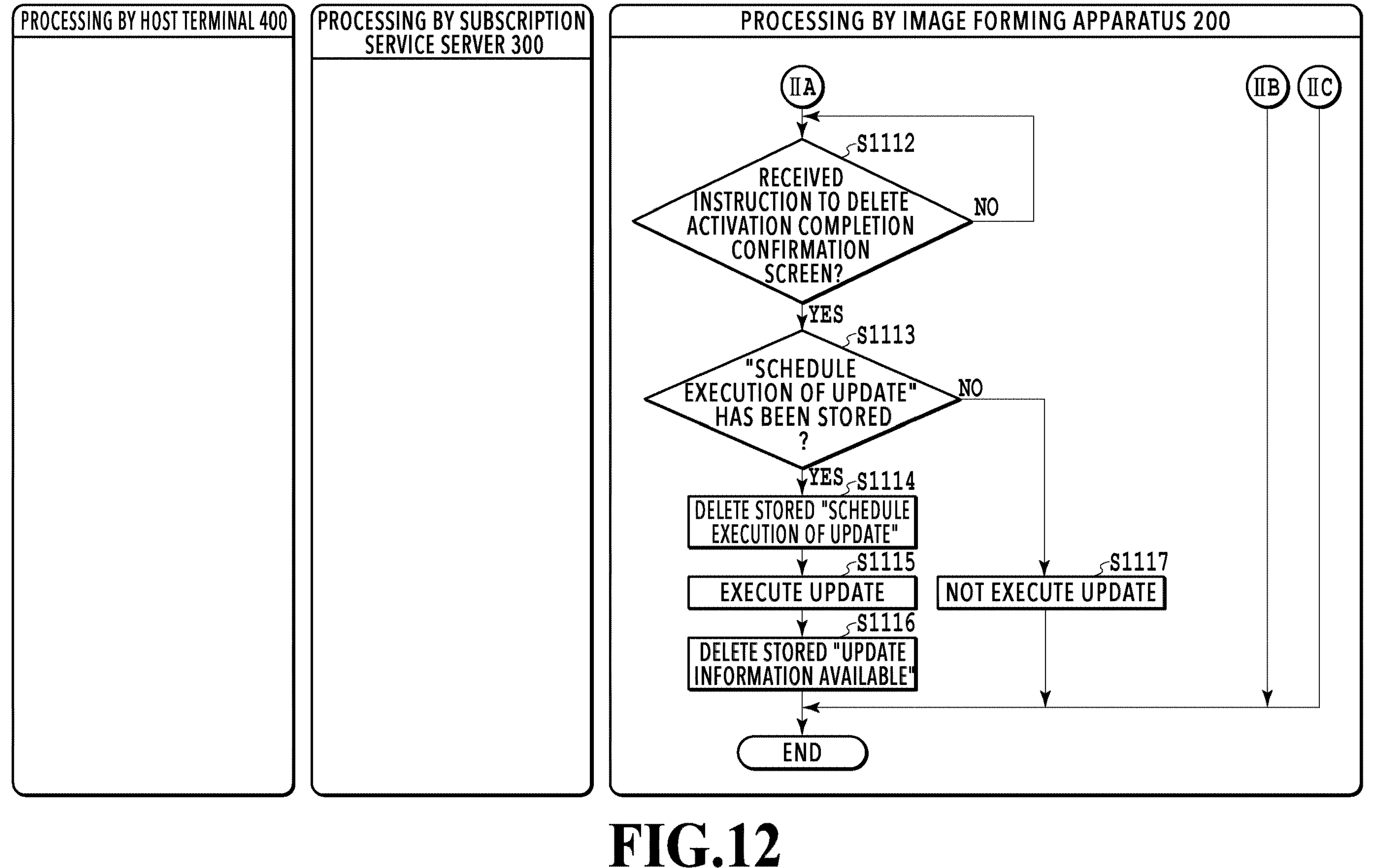
FIG. 12 is a second half of the flowchart illustrating the main portions of the operations of the host terminal, the subscription service server, and the image forming apparatus according to the second embodiment.

The process in the present embodiment will now be described using FIGS. 11 and 12. Note that the processes by each apparatus in the present embodiment are similar to those in the first embodiment unless otherwise noted, and overlapping description thereof is omitted. The process in the first embodiment illustrated in FIGS. 9 and 10 is a combination of the subscription service activation process illustrated in FIG. 4 and the update process using the value "update information available" that is stored in the process illustrated in FIG. 5. The process in the present embodiment illustrated in FIGS. 11 and 12, on the other hand, is a combination of the subscription service activation process illustrated in FIG. 4 and an update process using the value "execute scheduled update" that is stored in the process illustrated in FIG. 6. Thus, in the present embodiment, the process illustrated in FIG. 6 and the process illustrated in FIGS. 11 and 12 are both executed after the process illustrated in FIG. 3. In the process illustrated in FIG. 6, in response to receiving valid update information from the version management server 500, the image forming apparatus 200 stores "execute scheduled update" after receiving a permission from the user. In the process illustrated in FIGS. 11 and 12, after completing activation of a subscription service, the image forming apparatus 200 determines whether "execute scheduled update" is stored, and updates the firmware if it is stored.

The conditions to start the process illustrated in FIGS. 11 and 12 are similar to the conditions to start the process illustrated in FIGS. 9 and 10, and the processes of S1101 to S1112 in FIGS. 11 and 12 are similar to the processes of S901 to S912 in FIGS. 9 and 10 as well. Thus, overlapping description is omitted.

In S1113, the image forming apparatus 200 determines whether "execute scheduled update" has been stored. The image forming apparatus 200 determines that "execute scheduled update" has been stored in a case where the image forming apparatus 200 has executed step S612 of storing "execute scheduled update" (FIG. 6) before step S1113. If determining in S1113 that "execute scheduled update" has been stored, the image forming apparatus 200 advances the process to S1114. On the other hand, if determining that "execute scheduled update" has not been stored, the image forming apparatus 200 advances the process to S1117. In S1114, the image forming apparatus 200 deletes the stored "execute scheduled update." Specifically, the image forming apparatus 200 deletes the flag indicating "execute scheduled update" from the data memory 203. The subsequent processes of S1115 and S1116 are similar to the processes of S916 and S917 in FIGS. 9 and 10, and overlapping description thereof is therefore omitted. While the image forming apparatus 200 deletes the stored "execute scheduled update" in S1114, the configuration may be such that the image forming apparatus 200 deletes it after updating the firmware in S1115.

As described above, according to the present embodiment, it is possible to achieve the following. In a case where the image forming apparatus 200 determines that latest firmware is available before completion of activation of a subscription service, the image forming apparatus 200 can schedule execution of update. In a case where the image forming apparatus 200 has scheduled execution of update, the image forming apparatus 200 can update the firmware following the completion of the activation of the subscription service. In this way, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Third Embodiment

In the third embodiment, in a case where the image forming apparatus 200 determines that latest firmware is available after completion of activation of a subscription service, the image forming apparatus 200 confirms with the user whether to immediately execute firmware update at this point. If the user chooses to immediately execute firmware update, the image forming apparatus 200 updates the firmware. Thus, in the present embodiment too, the image forming apparatus 200 can avoid updating the firmware during activation of a subscription service.

Figure 13:
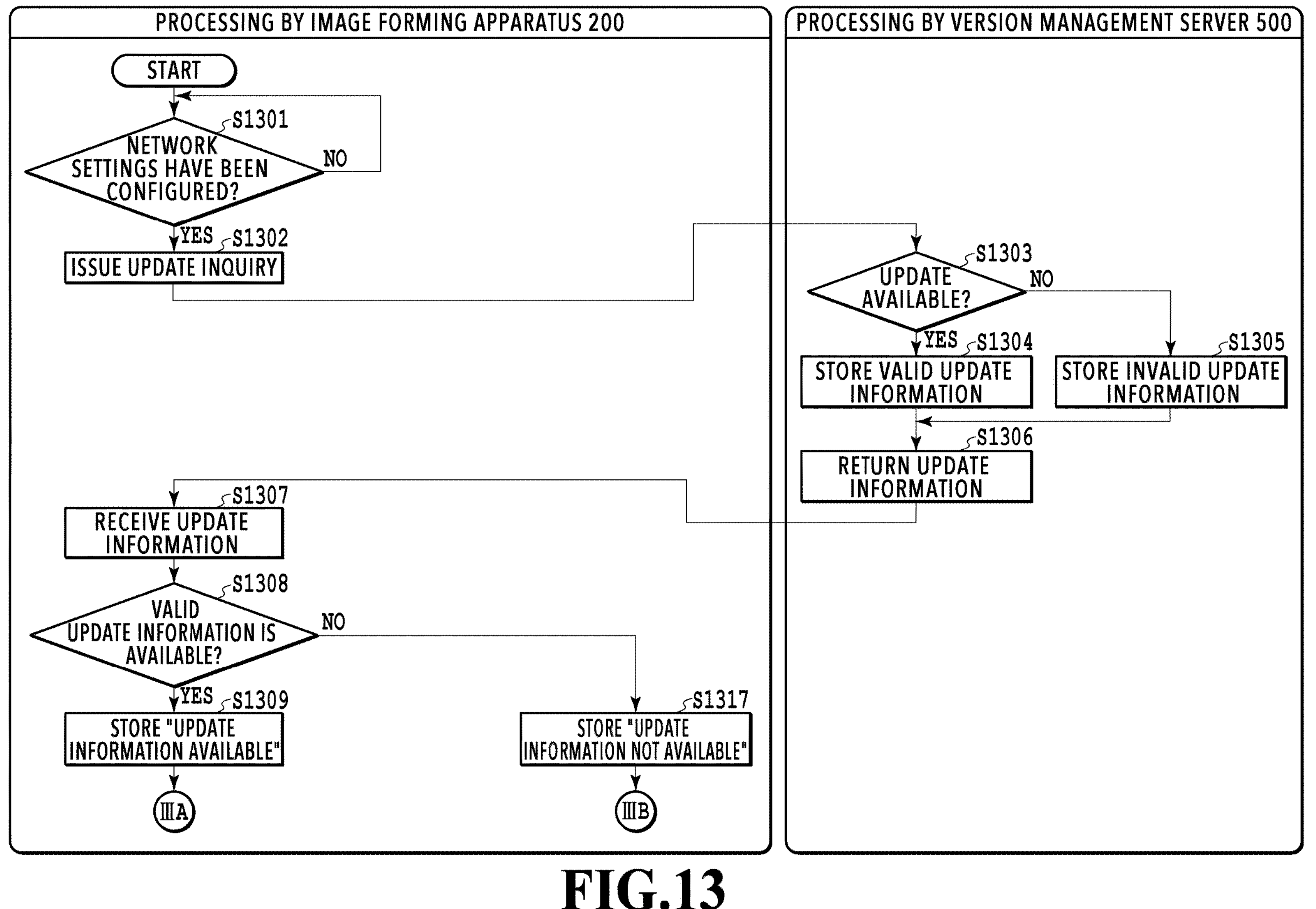
FIG. 13 is a first half of a flowchart illustrating main portions of operations of the host terminal, the subscription service server, and the image forming apparatus according to a third embodiment.
Figure 14:
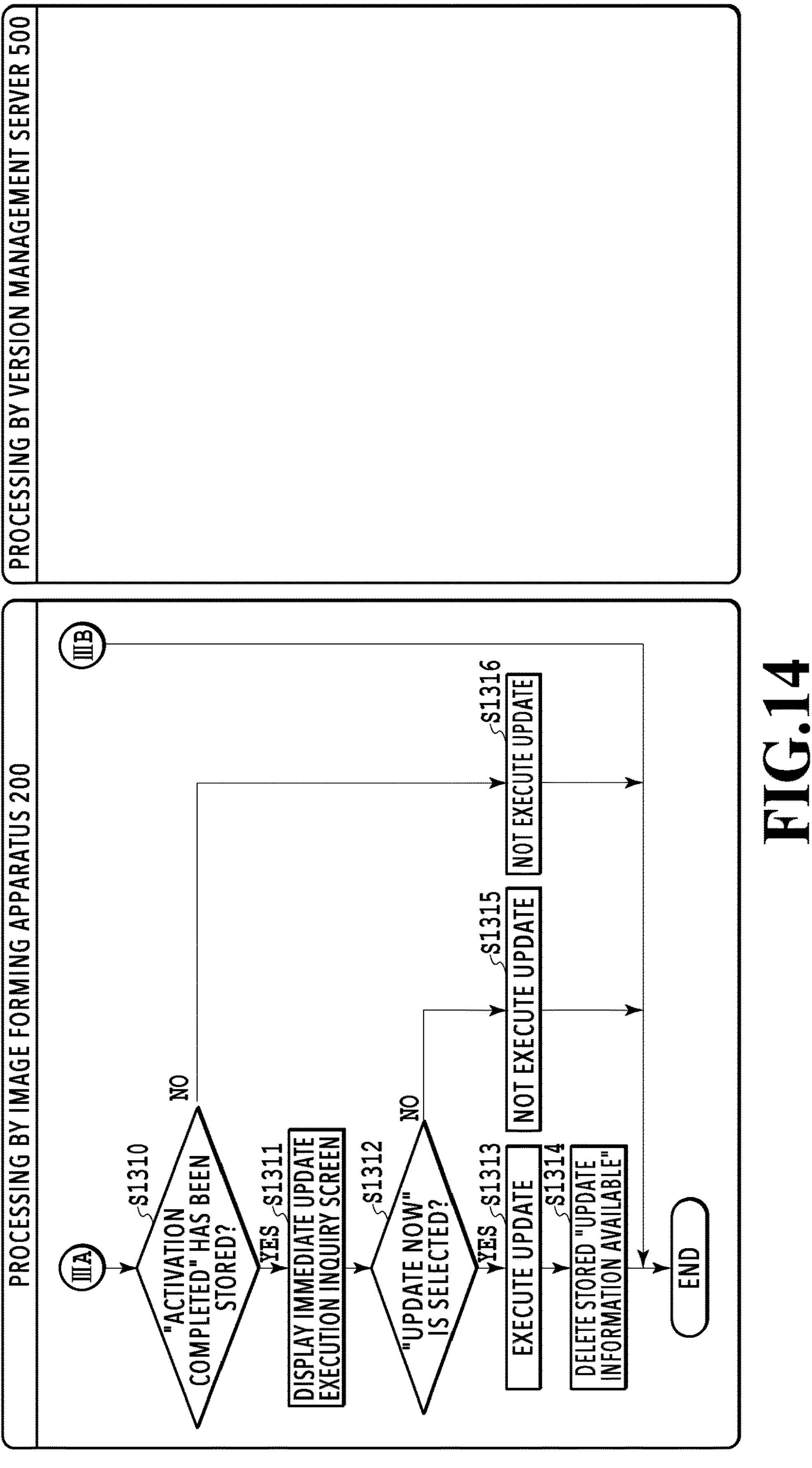
FIG. 14 is a second half of the flowchart illustrating the main portions of the operations of the host terminal, the subscription service server, and the image forming apparatus according to the third embodiment.

The process in the present embodiment will now be described using FIGS. 13 and 14. Note that the processes by each apparatus in the present embodiment are similar to those in the first and second embodiments unless otherwise noted, and overlapping description thereof is omitted. The process illustrated in FIGS. 13 and 14 is a combination of the process illustrated in FIG. 7 and a process using the value "activation completed" for a subscription service that is stored in the process illustrated in FIG. 4. Thus, in the present embodiment, the process illustrated in FIG. 4 and the process illustrated in FIGS. 13 and 14 are both executed after the process illustrated in FIG. 3. In the process illustrated in FIG. 4, in response to receiving an instruction to activate a subscription service from the subscription service server 300, the image forming apparatus 200 activates the subscription service and then stores "activation completed" for the subscription service. In the process illustrated in FIGS. 13 and 14, in response to receiving valid update information from the version management server 500, the image forming apparatus 200 confirms that "activation completed" has been stored. Then, the image forming apparatus 200 updates the firmware after receiving a permission to do so from the user.

The conditions to start the process illustrated in FIGS. 13 and 14 are similar to the conditions to start the process illustrated in FIG. 7, and the processes of S1301 to S1309 in FIGS. 13 and 14 are similar to the processes of S701 to S709 in FIG. 7 as well. Thus, overlapping description is omitted except for parts that need to be described.

In S1307, the image forming apparatus 200 receives update information. If determining in S1308 that the update information received in S1307 is valid, the image forming apparatus 200 stores "update information available" in S1309. After S1309, the image forming apparatus 200 executes S1310, which is added in the present embodiment.

In S1310, the image forming apparatus 200 determines whether "activation completed" has been stored for the subscription service. The image forming apparatus 200 determines that "activation completed" has been stored for the subscription service in a case where the image forming apparatus 200 has executed step S406 of storing "activation completed" for the subscription service (FIG. 4) before step S1310. If determining in S1310 that "activation completed" has been stored for the subscription service, the image forming apparatus 200 advances the process to S1311. On the other hand, if determining that "activation completed" has not been stored for the subscription service, the image forming apparatus 200 advances the process to S1316. The processes of S1311 to S1315 in FIGS. 13 and 14 are similar to the processes of S710 to S714 in FIG. 7, and overlapping description thereof is therefore omitted.

S1316 is a step executed by the image forming apparatus 200 in a case where it determines in S1310 that "activation completed" has not been stored for the subscription service. In this case, the image forming apparatus 200 terminates the process illustrated in the flowchart without executing update.

In a case where the image forming apparatus 200 determines in S1308 that update information is not available, the image forming apparatus 200 executes S1317. In this case, the image forming apparatus 200 stores "update information not available" in S1317, as in S715 in FIG. 7, and terminates the process illustrated in the flowchart. In other words, the image forming apparatus 200 does not update the firmware.

The above can be summarized as below. Specifically, in a case where activation of a subscription service has been completed when valid update information is received from the version management server 500 in S1307, the image forming apparatus 200 displays the immediate update execution inquiry screen 2806 on the display unit 208 in S1311. In a case where the user presses the "Update Now" button 2807 in the immediate update execution inquiry screen 2806, the image forming apparatus 200 updates the firmware in S1313. On the other hand, if the activation of the subscription service has not been completed when the valid update information is received in S1307, the image forming apparatus 200 does not update the firmware.

In the operation illustrated in FIGS. 13 and 14, the image forming apparatus 200 terminates the process without executing the update if determining in S1310 that "activation completed" has not been stored for the subscription service. Here, the operation illustrated in FIGS. 13 and 14 may be changed to the operation illustrated in FIGS. 15 and 16.

Figure 15:
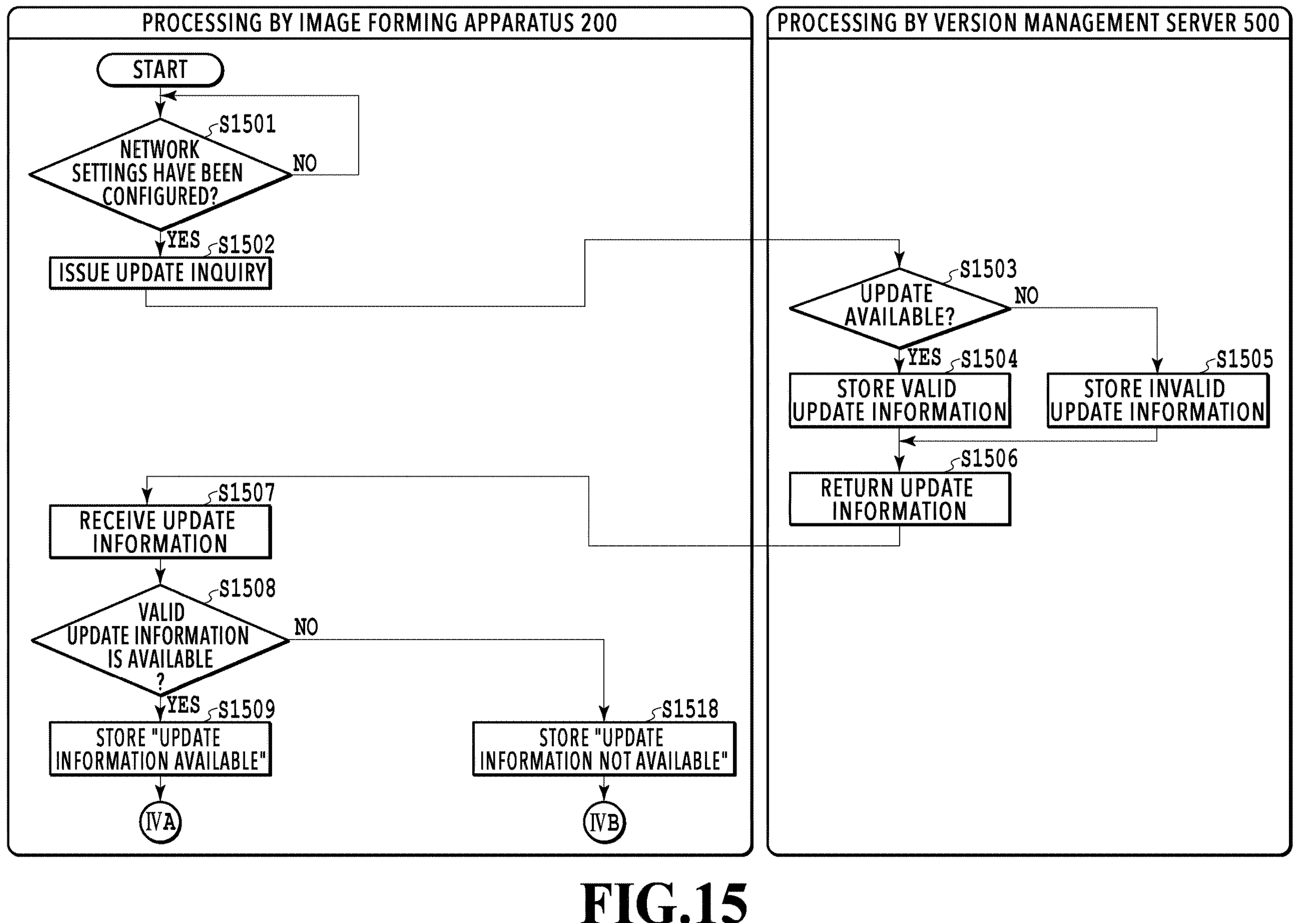
FIG. 15 is a first half of a flowchart illustrating main portions of other operations of the host terminal, the subscription service server, and the image forming apparatus according to the third embodiment.
Figure 16:
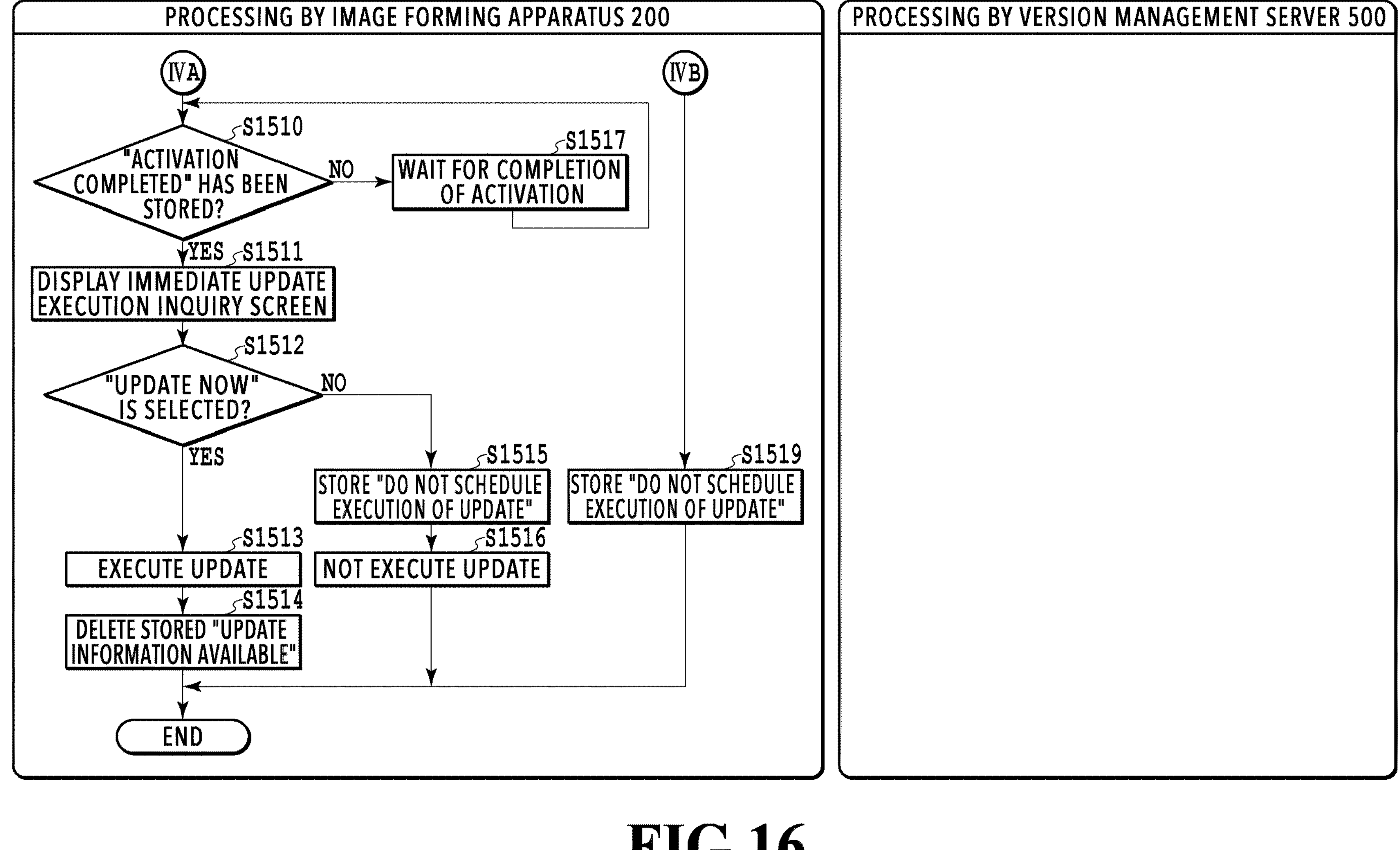
FIG. 16 is a second half of the flowchart illustrating the main portions of the other operations of the host terminal, the subscription service server, and the image forming apparatus according to the third embodiment.

The processes of S1501 to S1509, S1511 to S1516, S1518, and S1519 in FIGS. 15 and 16 are similar to the processes of S1301 to S1309, S1311 to S1316, S1318, and S1319 in FIGS. 13 and 14, and overlapping description thereof is therefore omitted.

In the operation illustrated in FIGS. 15 and 16, S1510 and S1517 replace S1310. If determining in S1510 that "activation completed" has not been stored for a subscription service, the image forming apparatus 200 proceeds to S1517, which is a step of waiting for the activation of the subscription service to be completed, and then executes S1510 again. In this way, the image forming apparatus 200 waits until S406 in FIG. 4, which is a step of storing "activation completed" for the subscription service, is executed. Thus, in the process illustrated in FIGS. 15 and 16, in the case where the activation of the subscription service has not been completed when the valid update information is received in S1307, the image forming apparatus 200 waits until the activation of the subscription service is completed. Then, the image forming apparatus 200 displays the immediate update execution inquiry screen 2806 on the display unit 208 when the activation of the subscription service is completed. In a case where the user presses the "Update Now" button 2807 in the immediate update execution inquiry screen 2806, the image forming apparatus 200 updates the firmware in S1513.

As described above, according to the present embodiment, it is possible to achieve the following. In a case where activation of a subscription service has been completed when latest firmware is determined to be available, the image forming apparatus 200 can immediately update the firmware. In this way, the image forming apparatus 200 can avoid updating the firmware before the completion of the activation of the subscription service. In other words, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Fourth Embodiment

In the first embodiment, when latest firmware is determined to be available before completion of activation of a subscription service, the user is not yet queried about whether to permit firmware update, and is queried about whether to permit the update after the completion of the activation of the subscription service. In the first embodiment, the subscription service server 300 is an external apparatus in which initial setup may be interrupted by firmware update. In the actual user environment, however, it is possible that initial setup in the host terminal 400, such as a smartphone or a personal computer, is also being performed at the same time. The fourth embodiment employs a configuration in combination with the first embodiment in which whether to permit firmware update is determined with completion of initial setup in the host terminal 400 taken as an additional criterion for making the determination.

Note that the configuration of each apparatus in the present embodiment is similar to those in the first to third embodiments unless otherwise noted, and overlapping description of the similar components is omitted. In the first embodiment, a description has been given using FIG. 5 and also FIGS. 9 and 10, which are based on FIG. 4. In the fourth embodiment, a description will be given using FIGS. 5 and 8 and also FIGS. 17 and 18, which are based on FIG. 4.

Figure 17:
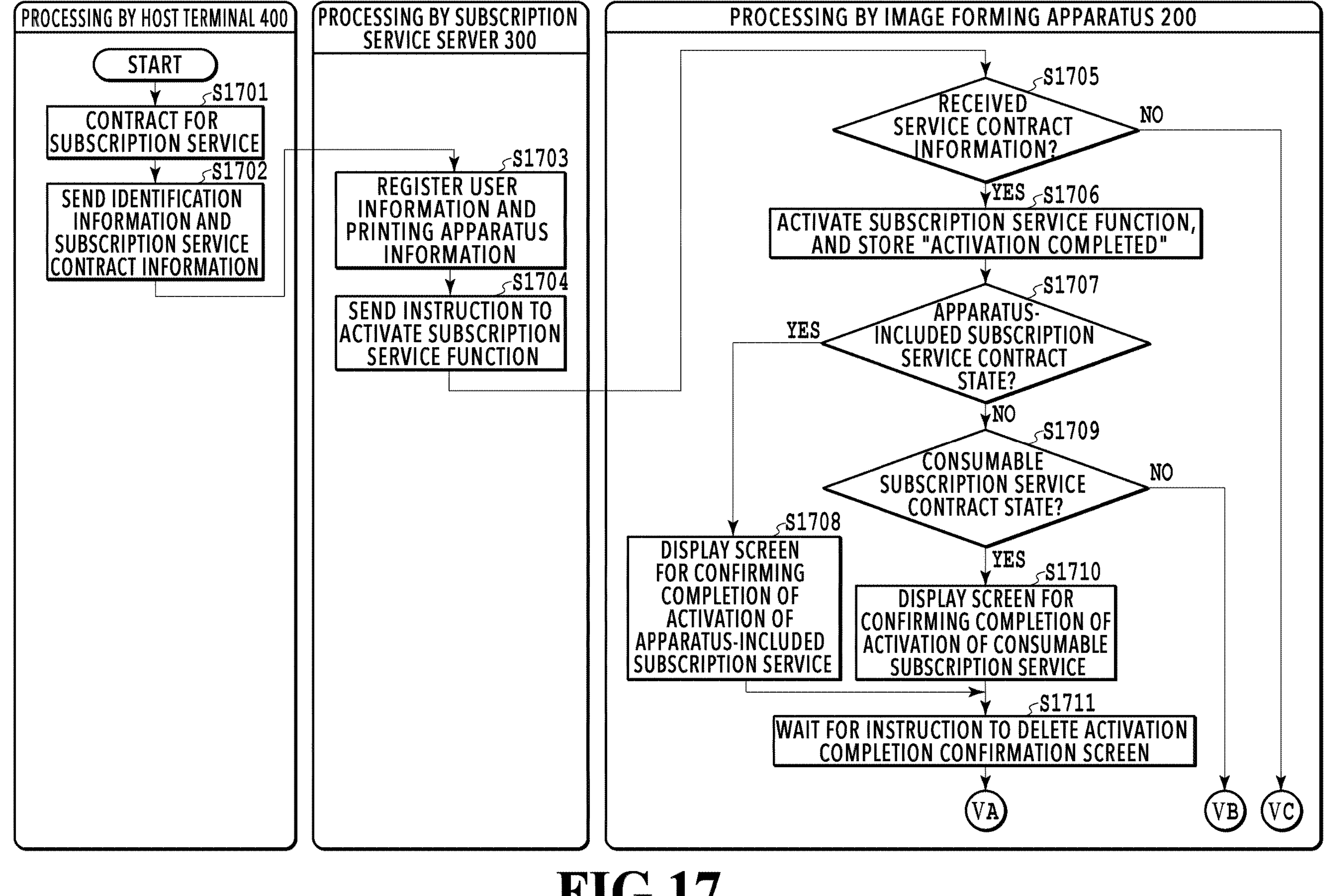
FIG. 17 is a first half of a flowchart illustrating main portions of operations of the host terminal, the subscription service server, and the image forming apparatus according to a fourth embodiment.
Figure 18:
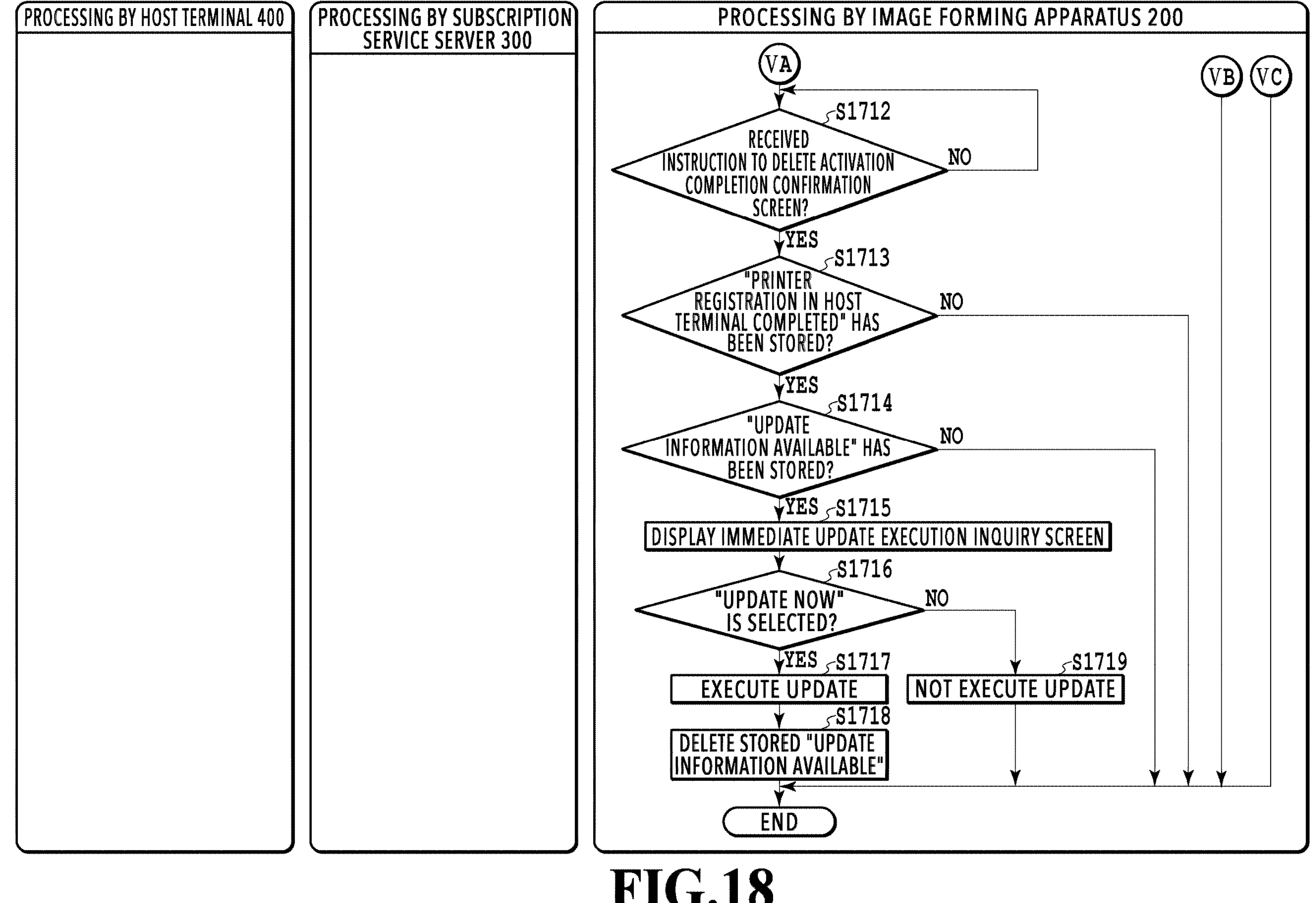
FIG. 18 is a second half of the flowchart illustrating the main portions of the operations of the host terminal, the subscription service server, and the image forming apparatus according to the fourth embodiment.

Like the process of the first embodiment illustrated in FIGS. 9 and 10, the process of the present embodiment illustrated in FIGS. 17 and 18 is a process combining an update process with the subscription service activation process illustrated in FIG. 4. Here, while whether "update information available" has been stored is determined by the process illustrated in FIG. 5 in the process of the first embodiment, whether "printer registration in the host terminal completed" has been stored is also determined by the process illustrated in FIG. 8 in the process of the present embodiment. Thus, in the present embodiment, the process illustrated in FIG. 5, the process illustrated in FIG. 8, and the process illustrated in FIGS. 17 and 18 are executed after the process illustrated in FIG. 3. Note that the process of the present embodiment illustrated in FIGS. 17 and 18 differs from the process of the first embodiment illustrated in FIGS. 9 and 10 in that the former additionally includes a process of determining whether "printer registration in the host terminal completed" has been stored by the process illustrated in FIG. 8. In the process illustrated in FIG. 5, in response to receiving valid update information from the version management server 500, the image forming apparatus 200 stores "update information available." Moreover, in the process illustrated in FIG. 8, in response to receiving "printer information registration completed" from the host terminal 400, the image forming apparatus 200 stores "printer registration in the host terminal completed." Furthermore, in the process illustrated in FIGS. 17 and 18, in response to completion of activation of a subscription service, the image forming apparatus 200 confirms that "printer registration in the host terminal completed" and "update information available" have been stored. Then, the image forming apparatus 200 updates the firmware after receiving a permission to do so from the user.

Figure 8:
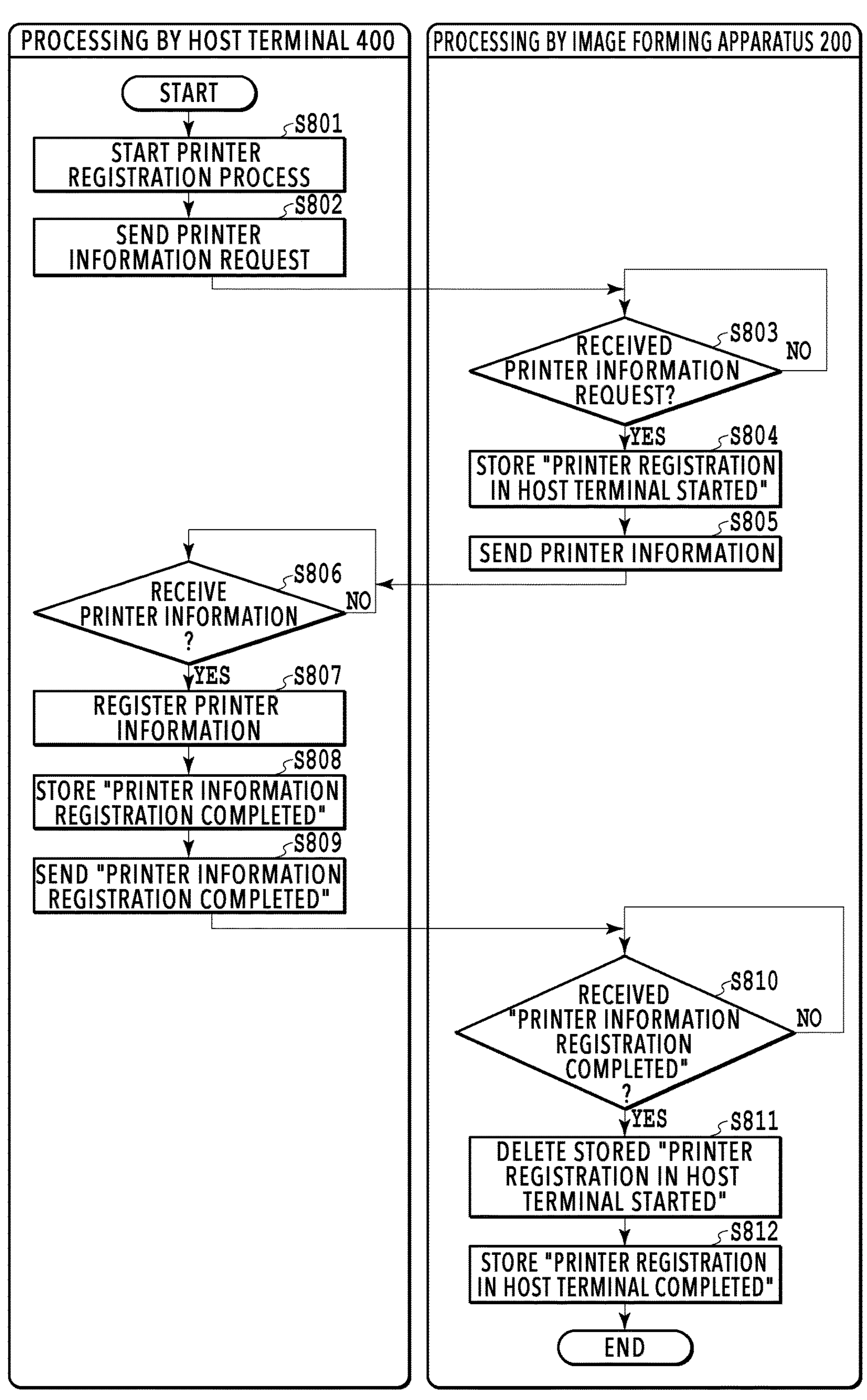
FIG. 8 is a flowchart of operations of a host terminal and the image forming apparatus for printer registration which is initial setup in the host terminal.

First, a description will be given using FIG. 8. The process illustrated in the flowchart starts after performing the processes for initial installation in FIG. 3. Meanwhile, the communication path for the image forming apparatus 200 to communicate with the host terminal 400 may be the network 101 or an USB cable, as mentioned earlier. Also, both communication through the network 101 and communication through a USB cable may be made ready to use, and either communication may be selected as appropriate. For example, communication through the USB cable may be selected in a case where communication through the network 101 is not available. In this way, in the case of NO in S308 in FIG. 3, the image forming apparatus 200 can skip S309 to S311 and use communication through the USB cable instead of communication through the network 101. Either way, the process illustrated in FIG. 8 can be executed as long as the image forming apparatus 200 can communicate with the host terminal 400 through a communication path.

In S801, the host terminal 400 starts a printer registration process. Then, in S802, the host terminal 400 sends a printer information request to the image forming apparatus 200. In S803, the image forming apparatus 200 waits to receive the printer information request from the host terminal 400. In response to receiving the printer information request from the host terminal 400 in S803, the image forming apparatus 200 advances the process to S804. Note that the image forming apparatus 200 waits for the printer information request from the host terminal 400 by repeating S803 until receiving the printer information request from the host terminal 400. In S804, the image forming apparatus 200 stores "printer registration in the host terminal started." Specifically, the image forming apparatus 200 saves a flag indicating "printer registration in the host terminal started" in the data memory 203.

In S805, the image forming apparatus 200 sends printer information to the host terminal 400. In S806, the host terminal 400 waits to receive the printer information from the image forming apparatus 200. In response to receiving the printer information from the image forming apparatus 200 in S806, the host terminal 400 advances the process to S807. Until receiving the printer information from the image forming apparatus 200, the host terminal 400 waits for the printer information from the image forming apparatus 200 by repeating S806. Here, the host terminal 400 may execute a timeout in a case where the printer information has not been sent from the image forming apparatus 200 for a predetermined time or longer. In S807, the host terminal 400 registers the printer information. This registration of the printer information includes installing a printer driver. Subsequently, in S808, the host terminal 400 stores "printer information registration completed." Then, in S809, the host terminal 400 sends "printer information registration completed" to the image forming apparatus 200.

In S810, the image forming apparatus 200 waits to receive "printer information registration completed" from the host terminal 400. In response to receiving "printer information registration completed" from the host terminal 400 in S810, the image forming apparatus 200 advances the process to S811. The image forming apparatus 200 waits for "printer information registration completed" from the host terminal 400 by repeating S810 until receiving "printer information registration completed" from the host terminal 400. In S811, the image forming apparatus 200 deletes "printer registration in the host terminal started" stored in S804. Specifically, the image forming apparatus 200 deletes the flag indicating "printer registration in the host terminal started" from the data memory 203. In S812, the image forming apparatus 200 stores "printer registration in the host terminal completed." Specifically, the image forming apparatus 200 saves a flag indicating "printer registration in the host terminal completed" in the data memory 203. The image forming apparatus 200 then terminates the process illustrated in the flowchart. The image forming apparatus 200 may execute a timeout in a case where "printer information registration completed" has not been sent from the host terminal 400 for a predetermined time or longer. In the case of executing a timeout, the image forming apparatus 200 deletes "printer registration in the host terminal started," as in S811.

Next, a description will be given using FIGS. 17 and 18. The conditions to start the process illustrated in FIGS. 17 and 18 are similar to the conditions to start the process illustrated in FIGS. 9 and 10, and the processes of S1701 to S1712 in FIGS. 17 and 18 are similar to the processes of S901 to S912 in FIGS. 9 and 10 as well. Thus, overlapping description is omitted.

In S1713, the image forming apparatus 200 determines whether "printer registration in the host terminal completed" has been stored. The image forming apparatus 200 determines that "printer registration in the host terminal completed" has been stored in a case where the image forming apparatus 200 has executed step S812 of storing "printer registration in the host terminal completed" (FIG. 8) before step S1713. If determining in S1713 that "printer registration in the host terminal completed" has been stored, the image forming apparatus 200 advances the process to S1714. On the other hand, if determining that "printer registration in the host terminal completed" has not been stored, the image forming apparatus 200 terminates the process illustrated in the flowchart. In other words, the image forming apparatus 200 does not update the firmware. The processes of S1714 to S1719 in FIGS. 17 and 18 are similar to the processes of S913 to S918 in FIGS. 9 and 10, and overlapping description thereof is therefore omitted.

As described above, according to the present embodiment, it is possible to achieve the following. In a case where the image forming apparatus 200 has already stored information indicating that latest firmware is available when activation of a subscription service is completed, and also printer registration in the host terminal has been completed, the image forming apparatus 200 can update the firmware following the completion of the activation of the subscription service. In this way, the image forming apparatus 200 can avoid updating the firmware before the completion of the activation of the subscription service. Moreover, the image forming apparatus 200 can avoid updating the firmware before the completion of the printer registration, which is initial setup in the host terminal 400. In other words, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Fifth Embodiment

In the fourth embodiment, when latest firmware is determined to be available before completion of activation of a subscription service, the user is not yet queried about whether to permit execution of firmware update. The user is queried about whether to permit execution of firmware update after the completion of the activation of the subscription service. Moreover, whether to query the user about whether to permit execution of firmware update is switched based on the result of the determination of whether the printer registration in the host terminal 400 has been completed. On the other hand, in the fifth embodiment, whether latest firmware is available is determined before the completion of the activation of the subscription service. In a case where latest firmware is determined to be available, the user is immediately queried about whether to execute scheduled firmware update. In this way, the firmware is updated without having to query the user about whether to permit execution of the firmware update after the completion of the activation of the subscription service. Incidentally, the influence of whether the printer registration in the host terminal 400 has been completed in this configuration will also be described.

Note that the configuration of each apparatus in the present embodiment is similar to those in the first to fourth embodiments unless otherwise noted, and overlapping description thereof is omitted. In the fourth embodiment, a description has been given using FIGS. 5 and 8 and also FIGS. 17 and 18, which are based on FIG. 4. In the fifth embodiment, a description will be given using FIGS. 6 and 8 and also FIGS. 19 and 20, which are based on FIG. 4.

Figure 19:
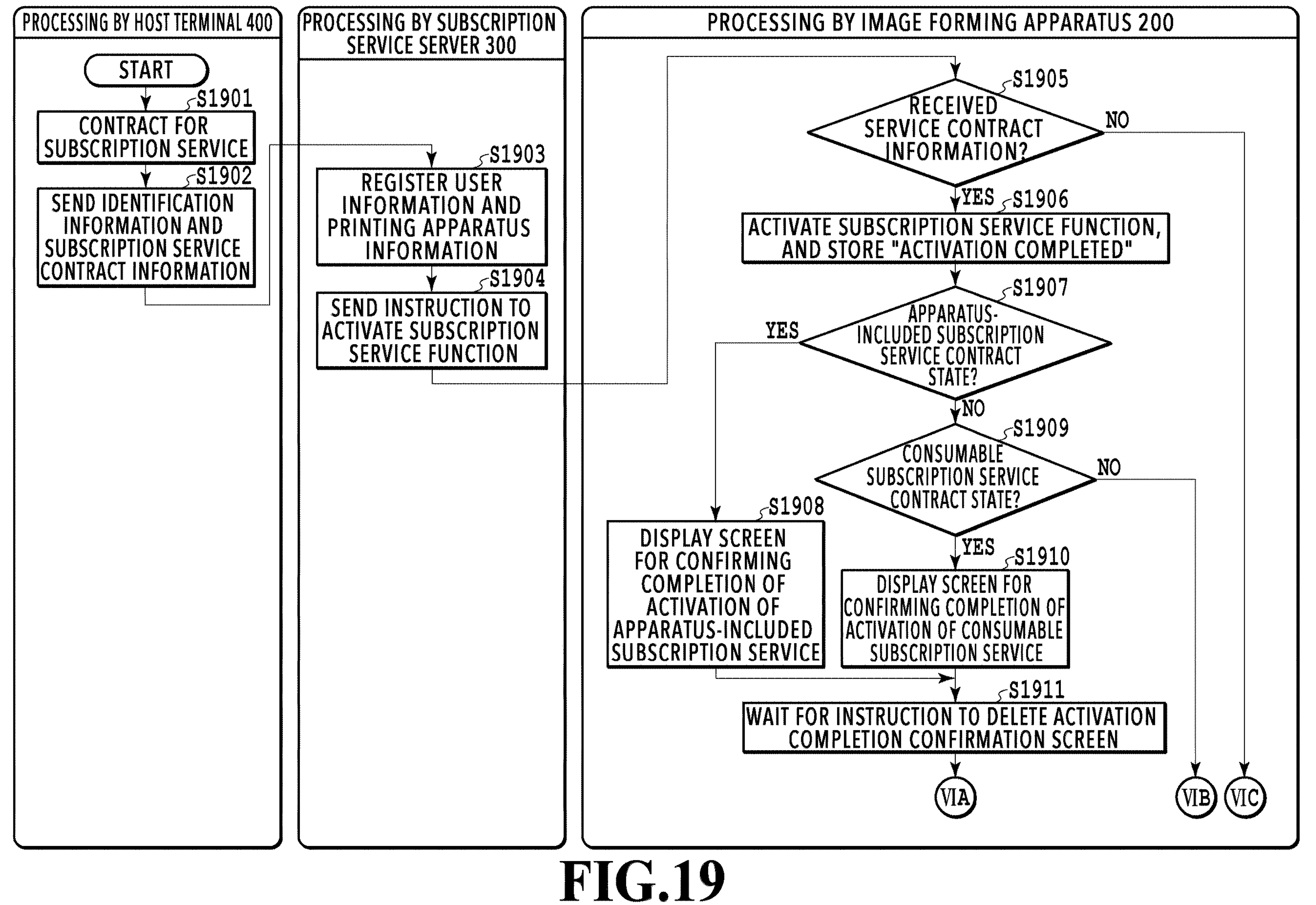
FIG. 19 is a first half of a flowchart illustrating main portions of operations of the host terminal, the subscription service server, and the image forming apparatus according to a fifth embodiment.
Figure 20:
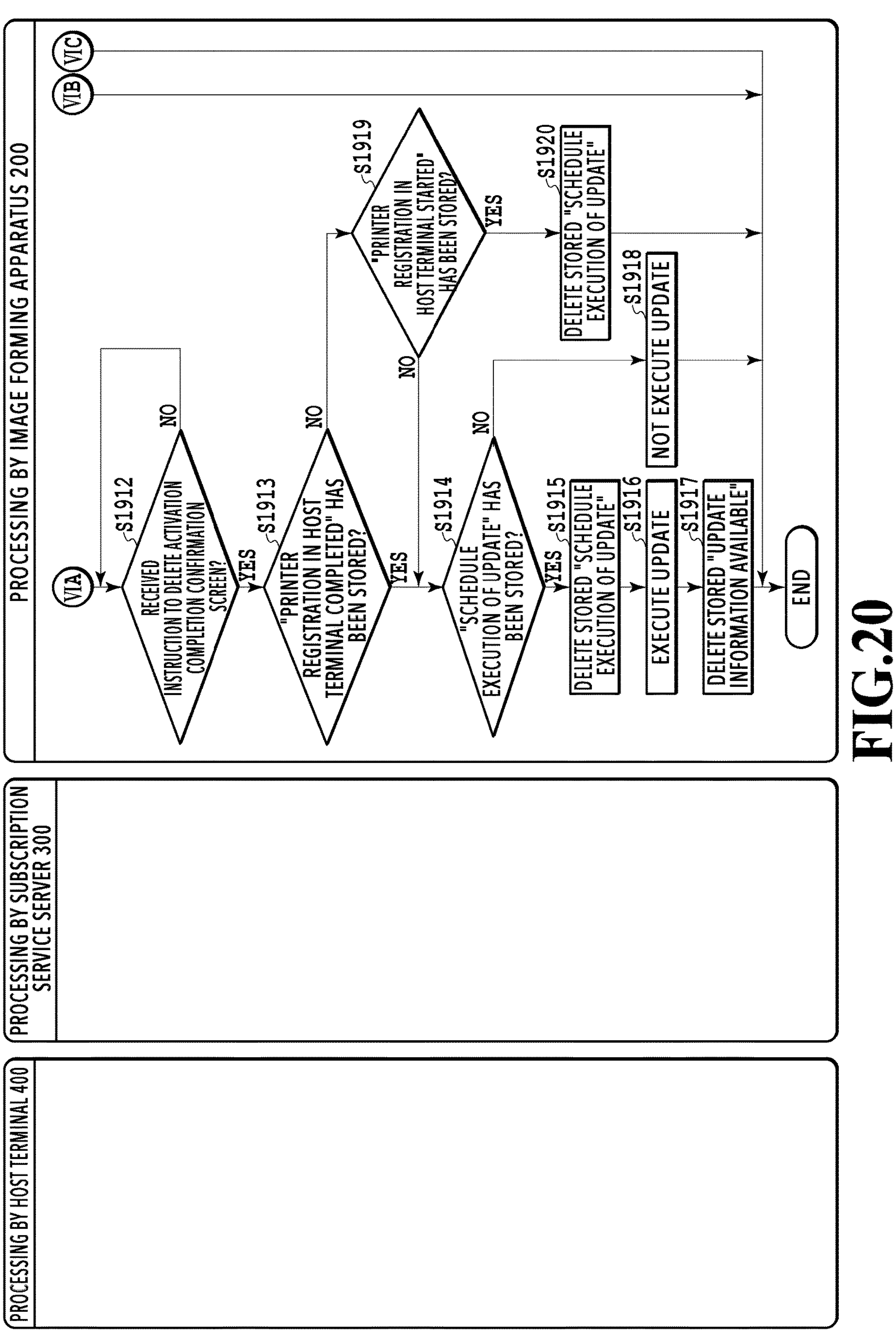
FIG. 20 is a second half of the flowchart illustrating the main portions of the operations of the host terminal, the subscription service server, and the image forming apparatus according to the fifth embodiment.

A description will be given using FIGS. 19 and 20. The conditions to start the process illustrated in FIGS. 19 and 20 are similar to the conditions to start the process illustrated in FIGS. 17 and 18, and the processes of S1901 to S1913 in FIGS. 19 and 20 are similar to the processes of S1701 to S1713 in FIGS. 17 and 18 as well. Thus, overlapping description is omitted. The processes of S1914 to S1918 in FIGS. 19 and 20 are similar to the processes of S1113 to S1117 in FIGS. 11 and 12, and overlapping description thereof is therefore omitted. In the present embodiment, the process illustrated in FIG. 6, the process illustrated in FIG. 8, and the process illustrated in FIGS. 19 and 20 are executed after the process illustrated in FIG. 3.

The image forming apparatus 200 executes S1919 if determining in S1913 that "printer registration in the host terminal completed" has not been stored. In S1919, the image forming apparatus 200 determines whether "printer registration in the host terminal started" has been stored. If the image forming apparatus 200 has already executed S804 in FIG. 8 but has not yet executed S811 in FIG. 8 when executing S1919, the image forming apparatus 200 determines that "printer registration in the host terminal started" has been stored. In other words, the image forming apparatus 200 determines YES in S1919 if initial setup in the host terminal 400 has started but has not yet been completed. In this case, the host terminal 400 is in the middle of the initial setup, and the image forming apparatus 200 needs to avoid executing firmware update in order to prevent interruption of the initial setup in the host terminal 400 by the execution of the firmware update. For this reason, the image forming apparatus 200 advances the process to S1920 if determining YES in S1919. In S1920, the image forming apparatus 200 deletes the stored "execute scheduled update." Specifically, the image forming apparatus 200 deletes the flag indicating "execute scheduled update" from the data memory 203. The image forming apparatus 200 then terminates the process illustrated in the flowchart. In other words, the image forming apparatus 200 does not update the firmware. On the other hand, if determining NO in S1919, the image forming apparatus 200 advances the process to S1914. This is because it is possible to determine that the user has not been using the host terminal 400 or that the initial setup in the host terminal 400 has not started from the results of the determinations in S1913 and S1919. In this case, the image forming apparatus 200 may execute firmware update since the execution of the firmware update will not interrupt any external apparatus. Thus, in S1914, the image forming apparatus 200 determines whether to update the firmware.

In the present configuration, the image forming apparatus 200 deletes the stored "execute scheduled update" in S1920. Alternatively, the configuration may be such that the image forming apparatus 200 does not delete it. Also, in this case, the configuration may be such that, even if the image forming apparatus 200 has executed S804 in FIG. 8 but has not executed S811 in FIG. 8 when executing S1920, the image forming apparatus 200 updates the firmware after executing S812 in FIG. 8. With this configuration, the image forming apparatus 200 can execute firmware update corresponding to "execute scheduled update" selected by the user without interrupting initial setup in an external apparatus. In the case of employing this configuration, a situation where a timeout is executed as a result of failing to execute S811 in FIG. 8 should be taken into account. Specifically, it is desirable that the image forming apparatus 200 update the firmware also in the case of executing a timeout as a result of failing to execute S811 in FIG. 8.

Another configuration may be employed in which, if determining YES in S1919, the image forming apparatus 200 queries the user about whether to immediately update the firmware. With this configuration, the user chooses not to immediately update the firmware in a case where the initial setup in the host terminal 400 is being executed. Also, in this case, the user can understand that the selected scheduled execution of firmware update has been disabled. In sum, the user can understand again that the firmware needs to be updated after the completion of the initial setup in the host terminal 400, and update the firmware after the completion. The user choses to immediately update the firmware in a case where the initial setup in the host terminal 400 ends in the middle or ends after the elapse of a predetermined waiting time. In this way, the image forming apparatus 200 can update the firmware.

As described above, according to the present embodiment, it is possible to achieve the following. The image forming apparatus 200 can avoid update to the latest firmware in a case where printer registration in the host terminal is being executed when activation of a subscription service is completed even if the execution of the firmware update has been scheduled. Even in the case of avoiding the firmware update as above, the image forming apparatus 200 can still execute the firmware update if the image forming apparatus 200 is given a permission to do so thereafter from the user knowing whether the host terminal is executing printer registration. In other words, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Sixth Embodiment

In the sixth embodiment, in response to receiving a notification from the host terminal 400 indicating that registration of printer information has been completed, the image forming apparatus 200 determines whether activation of a subscription service has already been completed. If the activation of the subscription service has already been completed, the image forming apparatus 200 confirms whether latest firmware has already been determined to be available. If the image forming apparatus 200 has already determined that latest firmware is available, the image forming apparatus 200 queries the user about whether to permit immediate execution of firmware update. In a case where the user selects "Update Now," the image forming apparatus 200 updates the firmware.

In the fourth embodiment, after completing the activation of the subscription service, the image forming apparatus 200 determines whether it has been notified of "printer information registration completed" by the host terminal 400. In the present embodiment, after being notified of "printer information registration completed" by the host terminal 400, the image forming apparatus 200 determines whether the activation of the subscription service has already been completed. The present embodiment is similar to the fourth embodiment in that the user is queried about whether to permit immediate execution of firmware update after confirming that latest firmware has already been determined to be available.

Figure 21:
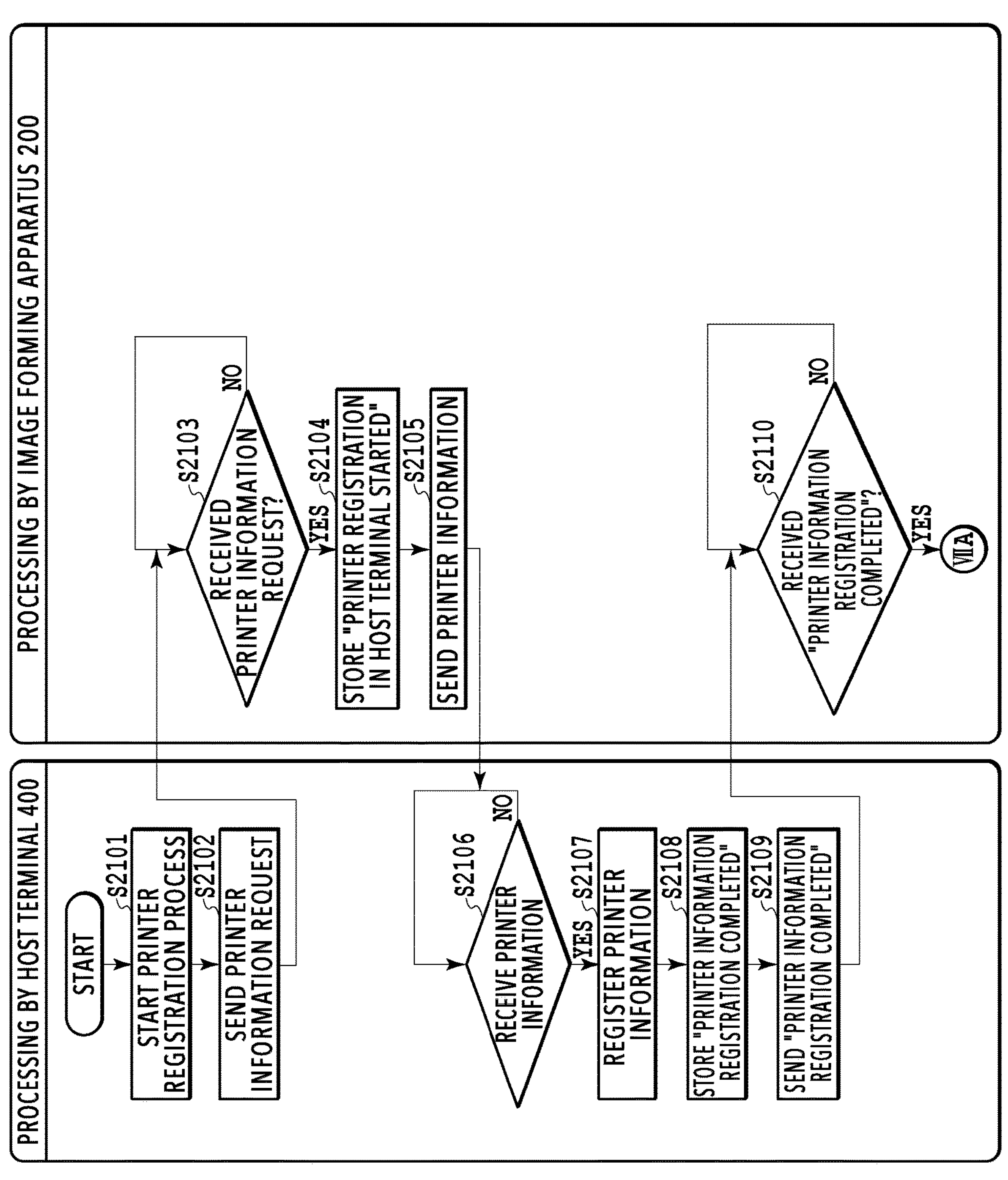
FIG. 21 is a first half of a flowchart illustrating main portions of operations of the host terminal, the subscription service server, and the image forming apparatus according to a sixth embodiment.
Figure 22:
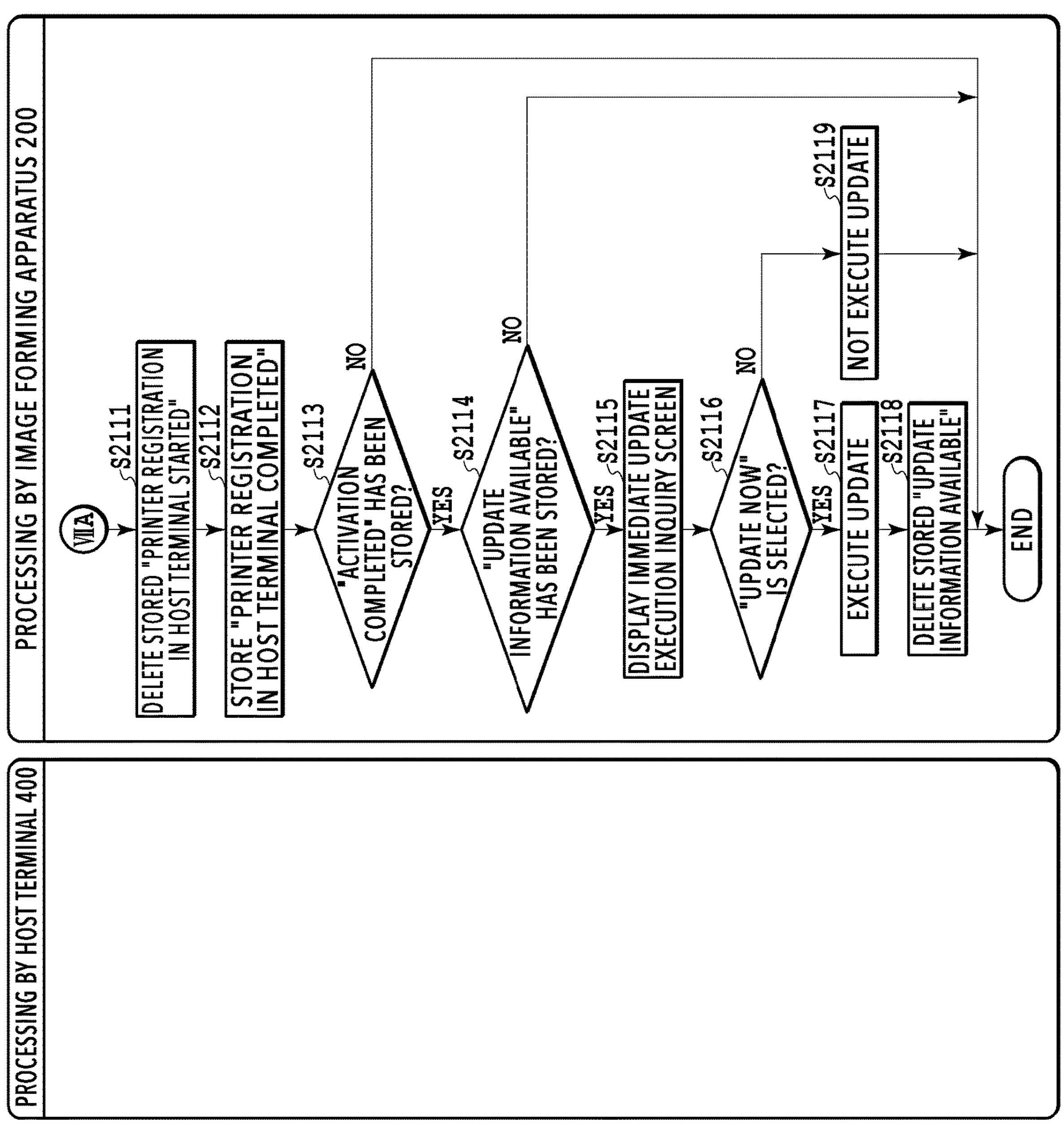
FIG. 22 is a second half of the flowchart illustrating the main portions of the operations of the host terminal, the subscription service server, and the image forming apparatus according to the sixth embodiment.

Note that the configuration of each apparatus in the present embodiment is similar to those in the first to fifth embodiments unless otherwise noted, and overlapping description thereof is omitted. In the fourth embodiment, a description has been given using FIGS. 5 and 8 and also FIGS. 17 and 18, which are based on FIG. 4. In the sixth embodiment, a description will be given using FIGS. 4 and 5 and also FIGS. 21 and 22, which are based on FIG. 8. In the present embodiment, the process illustrated in FIG. 4, the process illustrated in FIG. 5, and the process illustrated in FIGS. 21 and 22 are executed after the process illustrated in FIG. 3.

A description will be given using FIGS. 21 and 22. The conditions to start the process illustrated in FIGS. 21 and 22 are similar to the conditions to start the process illustrated in FIG. 8, and the processes of S2101 to S2112 in FIGS. 21 and 22 are similar to the processes of S801 to S812 in FIG. 8 as well. Thus, overlapping description is omitted. Also, the processes of S2114 to S2119 in FIGS. 21 and 22 are similar to the processes of S913 to S918 in FIGS. 9 and 10, and overlapping description thereof is therefore omitted.

In S2113, the image forming apparatus 200 determines whether "activation completed" has been stored for the subscription service. The image forming apparatus 200 determines that "activation completed" has been stored for the subscription service in a case where the image forming apparatus 200 has executed step S406 of storing "activation completed" for the subscription service (FIG. 4) before step S2113. If determining in S2113 that "activation completed" has been stored for the subscription service, the image forming apparatus 200 advances the process to S2114. On the other hand, if determining that "activation completed" has not been stored for the subscription service, the image forming apparatus 200 terminates the process illustrated in the flowchart. In other words, the image forming apparatus 200 does not update the firmware.

As described above, according to the present embodiment, it is possible to achieve the following. In a case where latest firmware has already been determined to be available and activation of a subscription service has already been completed when the host terminal 400 completes registration of the printer, the image forming apparatus 200 can update the firmware. In this way, the image forming apparatus 200 can avoid updating the firmware before the completion of the activation of the subscription service. Moreover, the image forming apparatus 200 can avoid updating the firmware before the completion of the initial setup in the host terminal 400. In other words, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Seventh Embodiment

The seventh embodiment is the first embodiment partly modified so as to delay the timing of querying the user about whether to permit immediate execution of firmware update. Specifically, in a case where the image forming apparatus 200 has determined that latest firmware is available when activation of a subscription service is completed, the image forming apparatus 200 queries the user about whether to permit immediate execution of firmware update after the elapse of a predetermined time. In a case where the user selects "Update Now," the image forming apparatus 200 updates the firmware.

In the first embodiment, in a case where the image forming apparatus 200 has already determined that latest firmware is available when the activation of the subscription service is completed, the image forming apparatus 200 immediately queries the user about whether to permit immediate execution of firmware update. For this reason, there is a possibility that this inquiry is made while an external apparatus is executing initial setup involving communication with the image forming apparatus 200. In such a case, if the user selects "Update Now" without knowing that the external apparatus is executing the initial setup, this action will interrupt the initial setup. Moreover, it may be difficult for the user to know the completion of the initial setup.

The fourth embodiment assumes that the host terminal 400, which is an external apparatus that executes initial setup involving communication with the image forming apparatus 200, is capable of notifying the image forming apparatus 200 of the completion of the initial setup. In a case where the image forming apparatus 200 has already determined that latest firmware is available when activation of a subscription service is completed, the image forming apparatus 200 also determines whether the external apparatus, or the host terminal 400, has finished the initial setup. If the initial setup has been finished, the image forming apparatus 200 queries the user about whether to permit immediate execution of firmware update.

There can be a configuration in which the image forming apparatus 200 cannot detect the completion of the initial setup in the external apparatus. The seventh embodiment is effective for such a configuration. In the seventh embodiment, the image forming apparatus 200 delays the timing of querying the user about whether to permit immediate execution of firmware update. This reduces the possibility of an external apparatus executing initial setup when the inquiry is made.

Figure 23:
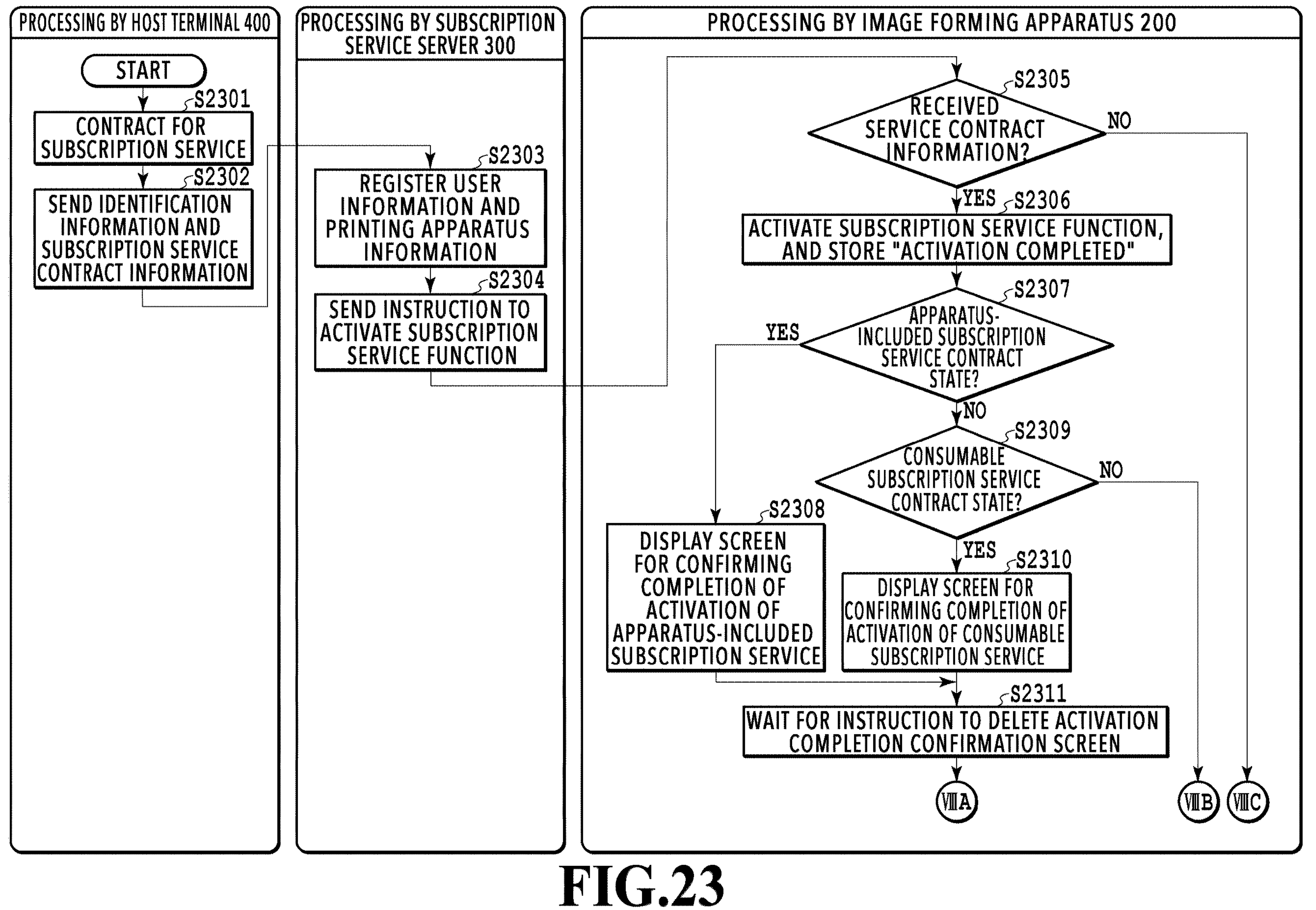
FIG. 23 is a first half of a flowchart illustrating main portions of operations of the host terminal, the subscription service server, and the image forming apparatus according to a seventh embodiment.
Figure 24:
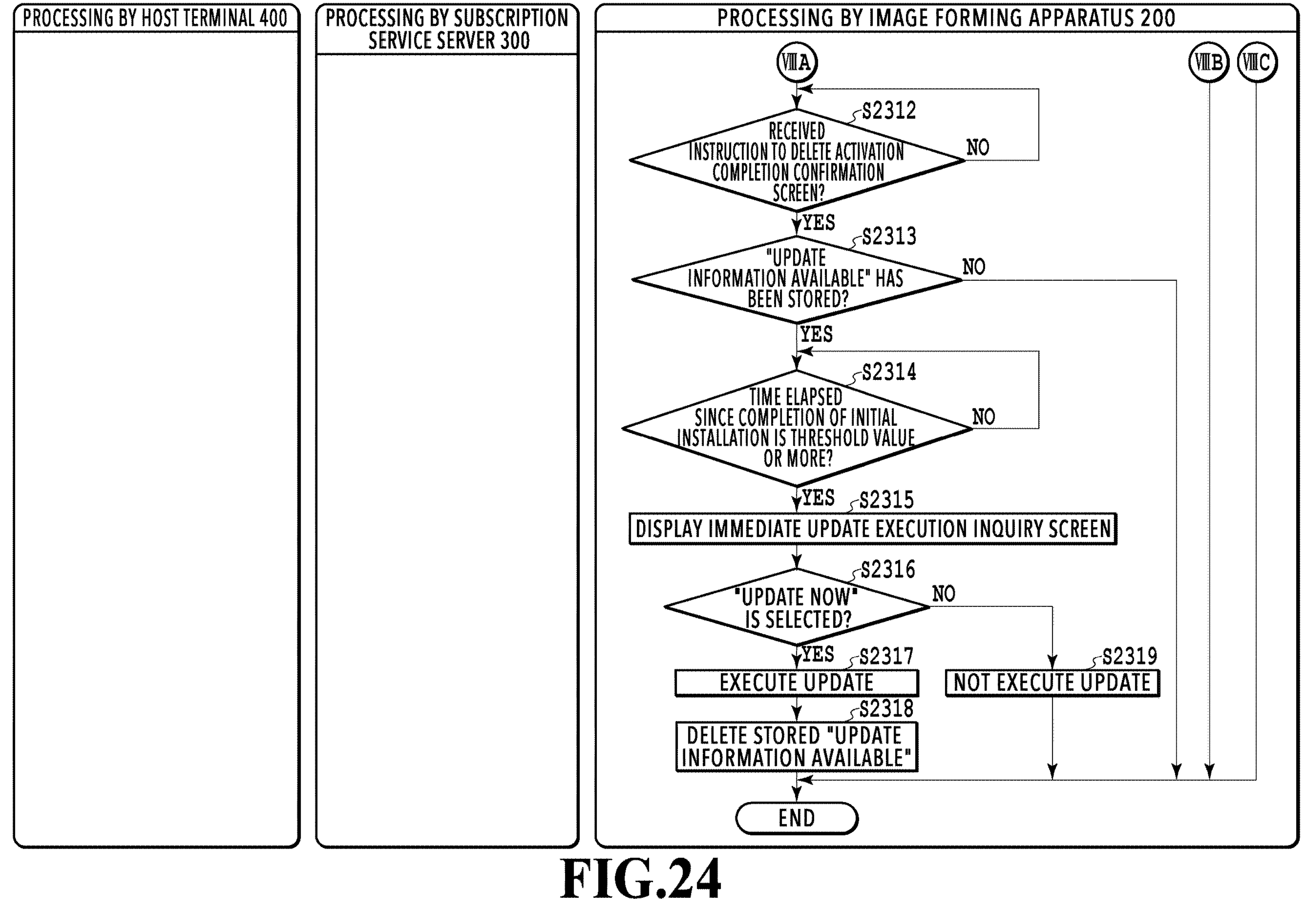
FIG. 24 is a second half of the flowchart illustrating the main portions of the operations of the host terminal, the subscription service server, and the image forming apparatus according to the seventh embodiment.

Note that the configuration of each apparatus in the present embodiment is similar to those in the first to sixth embodiments unless otherwise noted, and overlapping description thereof is omitted. In the first embodiment, a description has been given using FIG. 5 and also FIGS. 9 and 10, which are based on FIG. 4. In the seventh embodiment, a description will be given using FIGS. 3 and 5 and also FIGS. 23 and 24, which are based on FIG. 4. In the present embodiment, the process illustrated in FIG. 4 and the process illustrated in FIGS. 23 and 24 are executed after the process illustrated in FIG. 3.

A description will be given using FIGS. 23 and 24. The conditions to start the process illustrated in FIGS. 23 and 24 are similar to the conditions to start the process illustrated in FIGS. 9 and 10, and the processes of S2301 to S2313 in FIGS. 23 and 24 are similar to the processes of S901 to S913 in FIGS. 9 and 10 as well. Thus, overlapping description is omitted. Also, the processes of S2315 to S2319 in FIGS. 23 and 24 are similar to the processes of S914 to S918 in FIGS. 9 and 10, and overlapping description thereof is therefore omitted.

In S2314 following S2313, the image forming apparatus 200 determines whether or not the time elapsed since the completion of the initial installation is a threshold value or more. The time elapsed since the completion of the initial installation refers to the time from when the image forming apparatus 200 executes S306 in FIG. 3 to when the image forming apparatus 200 executes S2314. If determining in S2314 that the elapsed time is the predetermined threshold value or more, the image forming apparatus 200 advances the process to S2315. On the other hand, if determining in S2314 that the elapsed time is less than the predetermined threshold value, the image forming apparatus 200 waits until the elapsed time reaches or exceeds the threshold value by repeating S2314. This is for the user to wait substantially for the time it takes for the host terminal 400 to complete initial setup in a case where the user performs the initial setup in the host terminal 400 following initial setup in the image forming apparatus 200. This wait enables the following even with the configuration in which the image forming apparatus 200 cannot detect the completion of the initial setup in the host terminal 400. Specifically, the image forming apparatus 200 can avoid updating the firmware while the host terminal 400 is executing initial setup. With this taken into consideration, the predetermined threshold value used in S2314 is desirably determined based on the user's behavior. Specifically, a time longer than the time it takes for the user to complete the initial setup in the host terminal 400 is desirable. For example, assuming that many users perform the initial setup in the host terminal 400 following the initial setup in the image forming apparatus 200 and can complete the initial setup in the host terminal 400 in about 30 minutes, then, the predetermined threshold value may be exemplarily set to 1 hour. Alternatively, assuming that many users perform actions other than the initial setup, the predetermined threshold value may be exemplarily set to 24 hours. Also, in a case where the image forming apparatus 200 after initial installation undergoes software-power off and then software-power on again, the image forming apparatus 200 may assume in S2314 that the elapsed time is the threshold value or more. Specifically, with the initial setup flag being already cleared, the image forming apparatus 200 determines "NO" in S302 in FIG. 3, thus reaching S2314 without executing S306. In this case, the image forming apparatus 200 may assume in S2314 that the elapsed time is the threshold value or more. This is because the initial setup can be assumed to have already been done since software-power off has been performed. The software power-off refers to an operation in which the image forming apparatus 200 in a state where its software is powered on terminates the software in response to the user pressing the power button of the display unit 208.

As described above, according to the present embodiment, it is possible to achieve the following. In a case where the image forming apparatus 200 has already stored information indicating that latest firmware is available when activation of a subscription service is completed, the image forming apparatus 200 can update the firmware after the elapse of a predetermined time since the completion of the activation of the subscription service, not immediately after the completion of the activation. Specifically, even in the case of the configuration in which the image forming apparatus 200 cannot detect the completion of initial setup in the host terminal 400 (registration of the image forming apparatus 200), the image forming apparatus 200 can safely wait for the completion of the initial setup in the host terminal 400. In other words, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Eighth Embodiment

In the eighth embodiment, in a case where the time elapsed since the completion of the initial installation of the image forming apparatus 200 is less than a threshold value, an immediate update execution inquiry screen is displayed on the display unit of the host terminal 400 (not illustrated). In this way, in a case where multiple users are performing initial setup in the image forming apparatus 200 and initial setup in the host terminal 400 individually but simultaneously, it is possible to avoid interrupting the completion of the initial setup in the host terminal 400. In addition to avoiding the interruption, it is possible to update the firmware immediately after the initial setup in the host terminal 400. Also, in a case where the image forming apparatus 200 has a configuration with low display performance, such as a case where the display unit 208 includes only LEDs, it is possible to query the user about whether to permit the firmware update on the host terminal 400, which has higher display performance. Accordingly, visibility and operability are improved.

Figure 25:
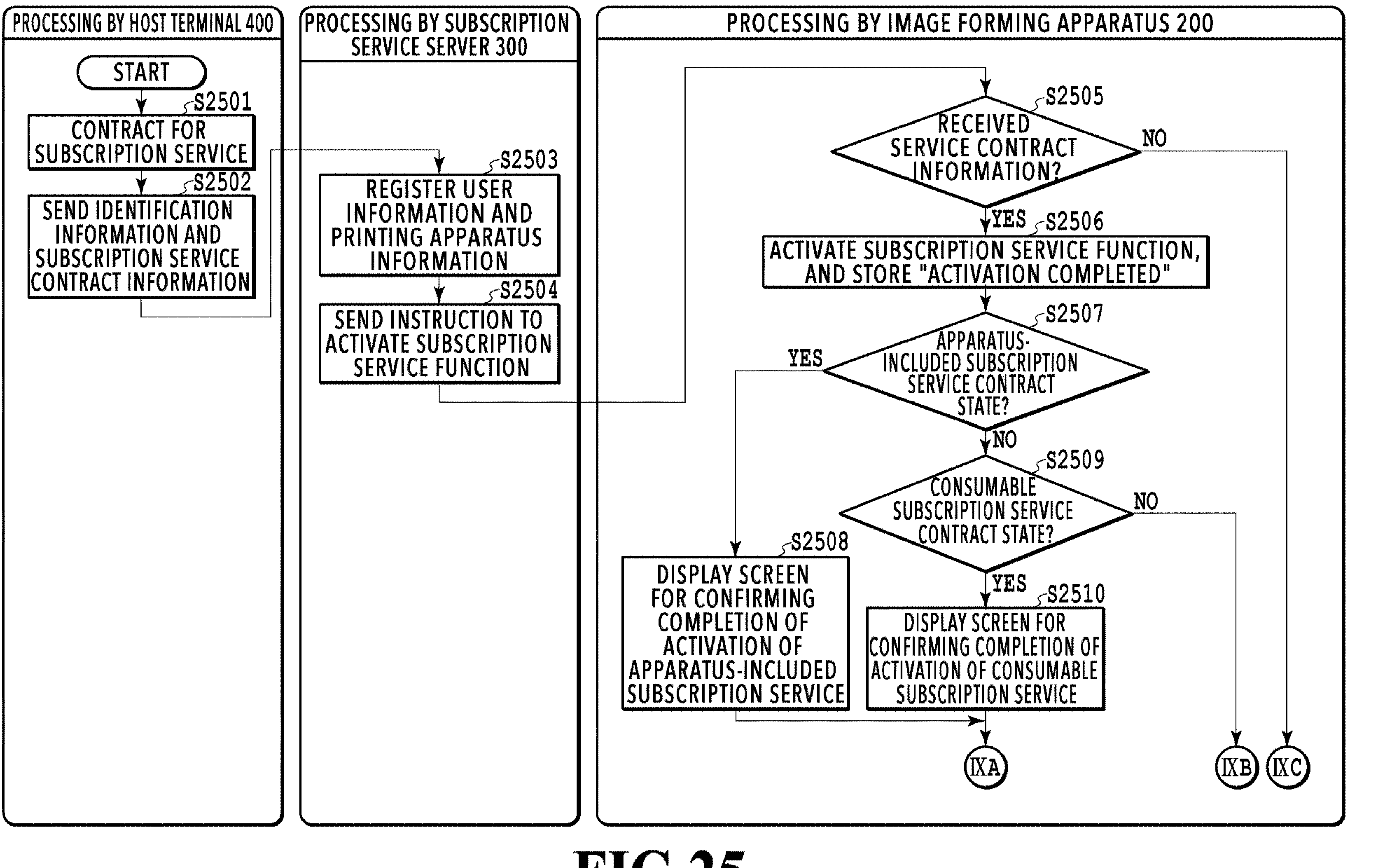
FIG. 25 is a first portion of a flowchart illustrating main portions of operations of the host terminal, the subscription service server, and the image forming apparatus according to an eighth embodiment.
Figure 26:
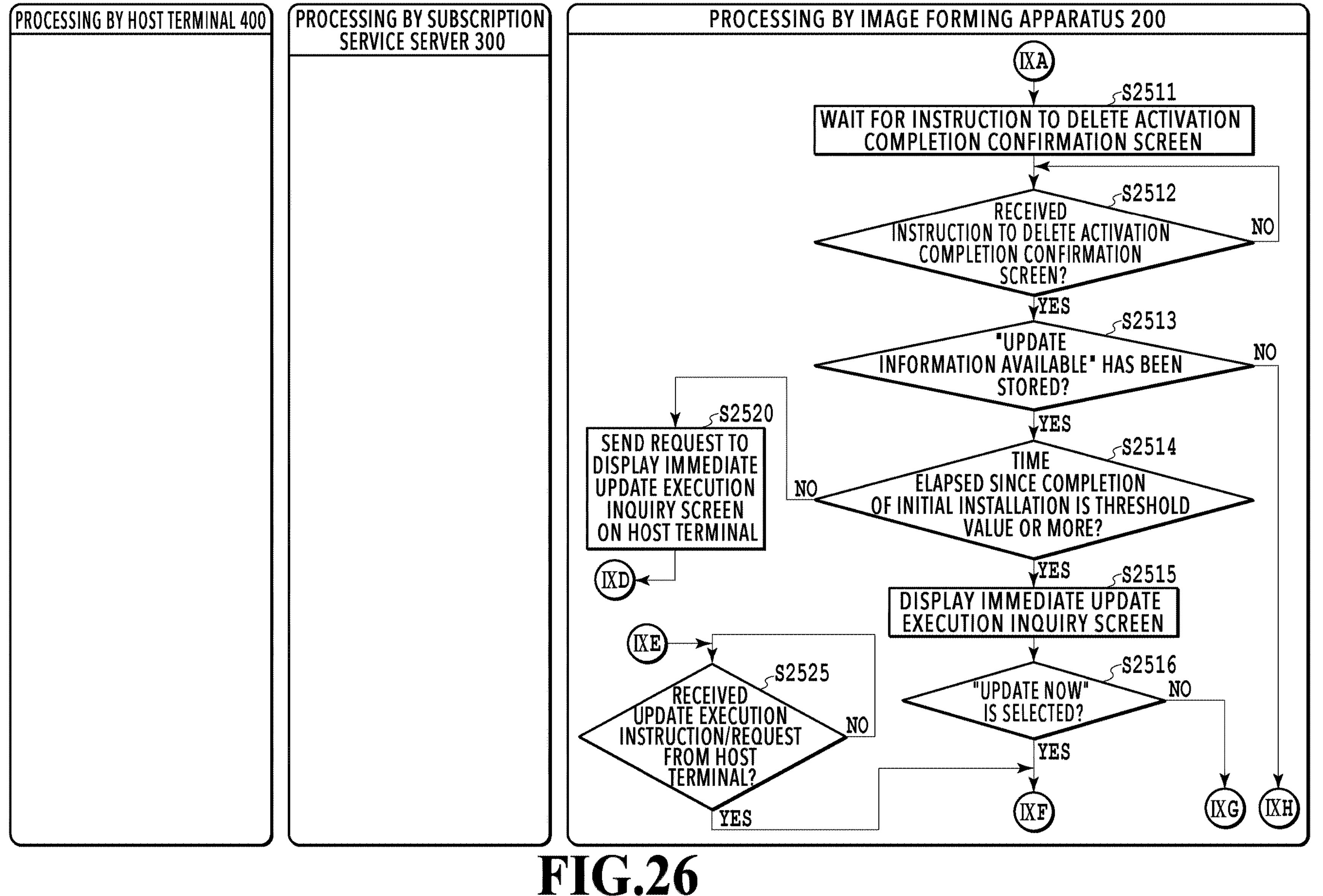
FIG. 26 is a second portion of the flowchart illustrating the main portions of the operations of the host terminal, the subscription service server, and the image forming apparatus according to the eighth embodiment.
Figure 27:
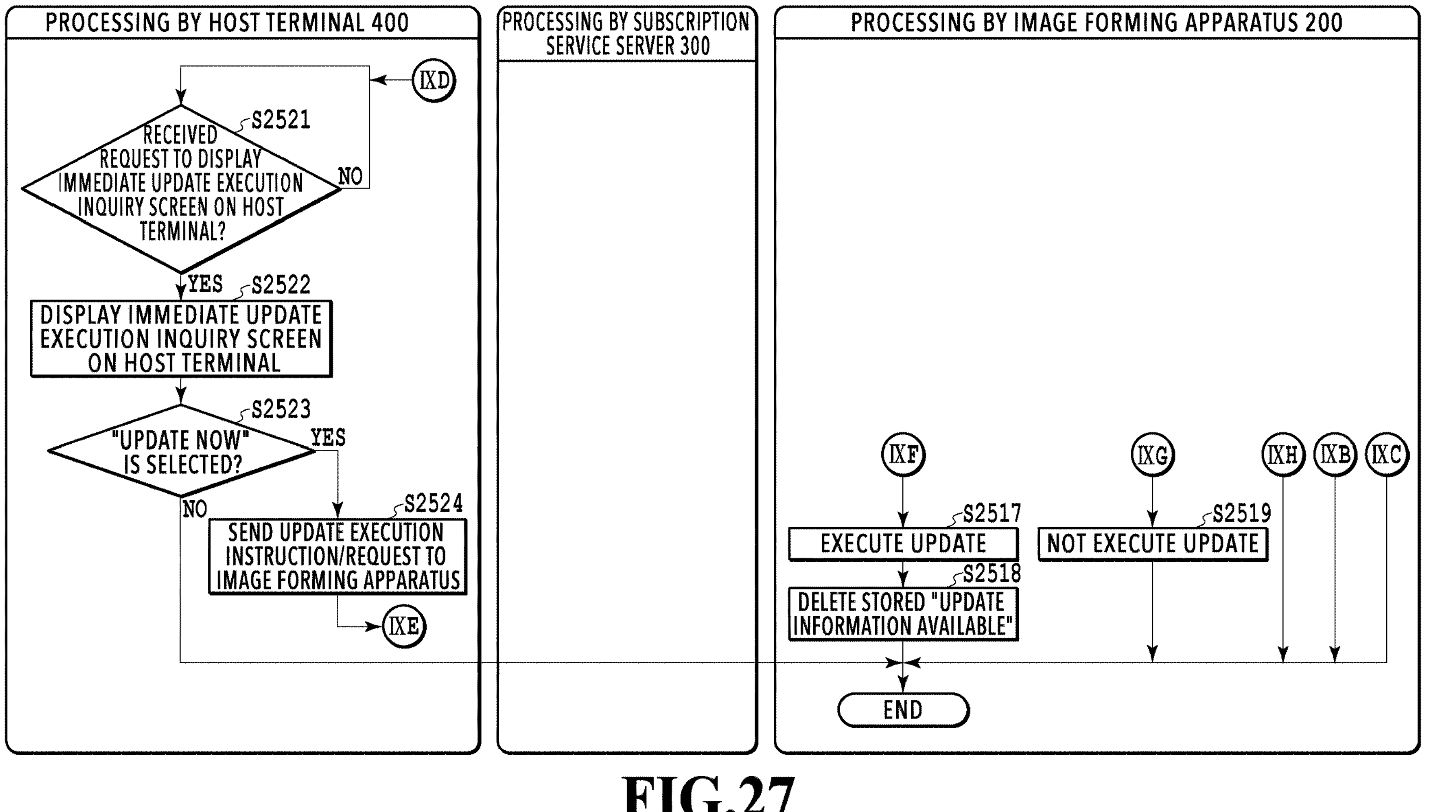
FIG. 27 is a third portion of the flowchart illustrating the main portions of the operations of the host terminal, the subscription service server, and the image forming apparatus according to the eighth embodiment.

Note that the configuration of each apparatus in the present embodiment is similar to those in the first to seventh embodiments unless otherwise noted, and overlapping description thereof is therefore omitted. In the seventh embodiment, a description has been given using FIGS. 3 and 5 and also FIGS. 23 and 24, which are based on FIG. 4. In the eighth embodiment, a description will be given using FIGS. 3 and 5 and also FIGS. 25, 26, and 27, which are based on FIG. 4. In the present embodiment, the process illustrated in FIG. 4 and the process illustrated in FIGS. 25, 26, and 27 are executed after the process illustrated in FIG. 3.

A description will be given using FIGS. 25, 26, and 27. The conditions to start the process illustrated in FIGS. 25, 26, and 27 are similar to the conditions to start the process illustrated in FIGS. 23 and 24, and the processes of S2501 to S2519 in FIGS. 25, 26, and 27 are similar to the processes of S2301 to S2319 in FIGS. 23 and 24 as well. Thus, overlapping description is omitted.

In S2514, the image forming apparatus 200 determines whether or not the time elapsed since the completion of the initial installation is a predetermined threshold value or more. If the elapsed time is less than the threshold value, the image forming apparatus 200 advances the process to S2520. In S2520, the image forming apparatus 200 sends the host terminal 400 a request to display the immediate update execution inquiry screen on the display unit of the host terminal 400. In S2521, the host terminal 400 waits to receive the request to display the immediate update execution inquiry screen on the display unit of the host terminal from the image forming apparatus 200. In response to receiving the request to display the immediate update execution inquiry screen on the display unit of the host terminal 400 from the image forming apparatus 200 in S2521, the host terminal 400 advances the process to S2522. The host terminal 400 waits to receive the request to display the immediate update execution inquiry screen on the display unit of the host terminal 400 from the image forming apparatus 200 by repeating S2521 until receiving the request from the image forming apparatus 200. In S2522, the host terminal 400 displays the immediate update execution inquiry screen on the display unit of the host terminal 400. In other words, the host terminal 400 queries the user about whether to immediately execute update, and waits for the user's choice. In S2523, the host terminal 400 lets the process branch according to the user's choice. If the user selects "Update Now" on the host terminal 400, the host terminal 400 advances the process to S2524. On the other hand, if the user selects "Do Not Update Now" on the host terminal 400, the process illustrated in the flowchart is terminated. In this case, the image forming apparatus 200 does not update the firmware. In S2524, the host terminal 400 sends an update execution instruction/request to the image forming apparatus 200.

In S2525, the image forming apparatus 200 waits to receive the update execution instruction/request from the host terminal 400. In response to receiving the update execution instruction/request from the host terminal 400 in S2525, the image forming apparatus 200 advances the process to S2517. The image forming apparatus 200 waits to receive the update execution instruction/request from the host terminal 400 by repeating S2525 until receiving the update execution instruction/request from the host terminal 400. Here, the configuration may be such that the image forming apparatus 200 executes a timeout if it does not receive the update execution instruction/request from the host terminal 400. In the case of executing a timeout, the image forming apparatus 200 advances the process to S2519 and skips the update. Incidentally, in the case where the user choses "Do Not Update Now" on the host terminal 400 in S2523, the host terminal 400 may send information indicating to skip the update to the image forming apparatus 200. In this case, after receiving the information indicating to skip the update from the host terminal 400, the image forming apparatus 200 advances the process to S2519 and skips the update.

As described above, according to the present embodiment, it is possible to achieve the following. Specifically, the image forming apparatus 200 can achieve the following in a case where information indicating that latest firmware is available has already been stored when activation of a subscription service is completed. In the case where the above condition is met, the image forming apparatus 200 can update the firmware via the host terminal 400 even if a predetermined time has not elapsed since the completion of the processes for initial installation of the image forming apparatus 200. Specifically, even in the case of the configuration in which the image forming apparatus 200 cannot detect the completion of initial setup in the host terminal 400 (registration of the image forming apparatus 200), the image forming apparatus 200 can safely wait for the completion of the initial setup in the host terminal 400. In other words, the image forming apparatus 200 can update the firmware in initial setup after completing communication with an external apparatus. Accordingly, the image forming apparatus 200 can update the firmware of the image forming apparatus 200 to the latest version without interrupting the initial setup at the start of use of the image forming apparatus 200.

Other Embodiments

In the third embodiment, the completion of the initial setup in the host terminal 400 may be added as a condition for the image forming apparatus 200 to update the firmware. Specifically, the image forming apparatus 200 may operate as follows. In a case where the image forming apparatus 200 determines that valid update information is available, the image forming apparatus 200 confirms whether activation of a subscription service has already been completed and the initial setup in the host terminal 400 (registration of the image forming apparatus 200) has already been completed. In a case where the image forming apparatus 200 confirms the subscription service activation and the initial setup have both been completed, the image forming apparatus 200 displays an immediate update execution inquiry screen, and updates the firmware if the user selects and inputs "Update Now." Specifically, for example, S1713 illustrated in FIG. 18 (a branching point determining whether "printer registration in the host terminal completed" has been stored) may be inserted between S1309 and S1310 illustrated in FIGS. 13 and 14 and, if YES, the process may proceed to S1310. Alternatively, the wait by the loop in S2314 illustrated in FIG. 24 may be inserted between S1309 and S1310 illustrated in FIGS. 13 and 14. The loop in S2314 is a wait loop based on the time elapsed since the completion of the initial installation.

In the third embodiment, like the eighth embodiment, the host terminal 400 may display an update execution inquiry screen and have the user select and input "Update Now." For example, S2514 illustrated in FIG. 27 may be inserted between S1309 and S1310 illustrated in FIGS. 13 and 14 and, if YES in S2514, the process may branch to S2520 to S2525 illustrated in FIG. 27, and proceed to S1310 if YES in S2525. Here, S2514 is a branching point determining whether or not the time elapsed since the completion of the initial installation is a threshold value or more.

The image forming apparatus 200 may omit the step of displaying the screen illustrated in FIG. 28A and waiting until the user presses the "OK" button 2802. In this case, the image forming apparatus 200 may advance the process from the immediately preceding step to the immediately following step. For example, in the process illustrated in FIGS. 9 and 10, the image forming apparatus 200 may proceed directly to S913 from S908 or S910.

The image forming apparatus 200 may omit the process of displaying the screen illustrated in FIG. 28B and waiting until the user presses the "Schedule Update" button 2804 or the "Dot Not Schedule Update" button 2805. In this case, the image forming apparatus 200 advances the process from the immediately preceding step to the step to proceed in response to pressing the "Schedule Update" button 2804. For example, in the process illustrated in FIGS. 11 and 12, the image forming apparatus 200 may proceed directly to S1114 if YES in S1112.

The image forming apparatus 200 may omit the process of displaying the screen illustrated in FIG. 28C and waiting until the user presses the "Update Now" button 2807 or the "Dot Not Update Now" button 2808. In this case, the image forming apparatus 200 advances the process from the immediately preceding step to the step to proceed in response to pressing the "Update Now" button 2807. For example, in the process illustrated in FIGS. 9 and 10, the image forming apparatus 200 may proceed directly to S916 if YES in S913.

In the first and second embodiments, in a case where activation of a subscription service is completed after firmware update is determined to be available, the firmware update is performed after receiving a permission to do so from the user. Here, in the first and second embodiments, if firmware update is determined to be available after the activation of the subscription service is completed, there is no opportunity to perform the firmware update. In the third embodiment, on the other hand, in a case where firmware update is determined to be available after the activation of the subscription service is completed, the firmware update is performed. Thus, in a case a single image forming apparatus implements the first and third embodiments, then, the image forming apparatus can execute firmware update regardless of whether the firmware update is determined to be available before the activation of the subscription service is completed or vice versa. The modification of the third embodiment (FIGS. 15 and 16) can handle both cases. Specifically, in the modification of the third embodiment, the loop in S1510 and S1517 makes it possible to execute firmware update regardless of whether the firmware update is determined to be available before the activation of the subscription service is completed or vice versa.

In a case where "activation completed" has been stored and a step of determining whether "update information available" has been stored is repeated in a loop in a separate process and if it is determined YES, the firmware may be updated. In sum, in such a case, firmware update can be executed regardless of whether the firmware update is determined to be available before the activation of the subscription service is completed or vice versa. Moreover, based on this, the process may additionally include a step of receiving a permission from the user.

Furthermore, a step of determining whether "activation completed" has been stored, "update information available" has been stored, and initial setup in the host terminal has been completed may repeated in a loop. If it is determined YES, the firmware may be updated. In sum, in such a case, firmware update can be executed regardless of whether the firmware update is determined to be available before the activation of the subscription service is completed and the initial setup in the host terminal is completed, or the activation of the subscription service is completed before the firmware update is determined to be available and the initial setup in the host terminal is completed, or the initial setup in the host terminal is completed before the firmware update is determined to be available and the activation of the subscription service is completed. Moreover, based on this, the process may additionally include a step of receiving a permission from the user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-013401, filed on Jan. 31, 2023, which is hereby incorporated by reference wherein in its entirety.

What is claimed is:

1. An information processing apparatus comprising:

one or more memories storing instructions, and one or more processors capable of executing the instructions causing the information processing apparatus to:

restrict a process related to updating predetermined firmware installed in the information processing apparatus in a case where setup for activating a subscription service on the information processing apparatus, involving communication with a server, has not been completed; and execute the process related to updating the predetermined firmware in response to completion of the setup for activating the subscription service after update information on update of the predetermined firmware is received.

2. The information processing apparatus according to claim 1, wherein the setup is completed after the update information is received.

3. The information processing apparatus according to claim 1, wherein the update information is received after the setup is completed.

4. The information processing apparatus according to claim 1, wherein the process related to updating the predetermined firmware is executed in in response to completion of the setup for activating the subscription service after the update information is received and initial setup in a host terminal involving communication with the host terminal is completed.

5. The information processing apparatus according to claim 1, wherein the instructions further cause the information processing apparatus to, in the process related to updating the predetermined firmware, request input of a permission for the update of the predetermined firmware from a user before performing the update.

6. The information processing apparatus according to claim 1, wherein the instructions further cause the information processing apparatus to display a screen that requests input of a permission for the update from a user in response to receiving the update information, and wherein the process related to updating the predetermined software is executed in response to completion of the setup after obtaining input of the permission from the user on the screen.

7. The information processing apparatus according to claim 1, wherein the instructions further cause the information processing apparatus to execute the update of the predetermined firmware in a case where a predetermined time elapses after completion of the setup of the subscription service and reception of the update information both occur.

8. The information processing apparatus according to claim 1, wherein the update information is received as a response to an inquiry addressed to a version management server which is made after completion of a functionality operation involved in initial installation of the information processing apparatus and configuration of a network setting which are preceded by placement of the information processing apparatus.

9. The information processing apparatus according to claim 8, wherein the instructions further cause the information processing apparatus to execute the communication with the server for the setup of the subscription service and queries the version management server after completion of initial setup of a network.

10. The information processing apparatus according to claim 1, further comprising a print engine that executes printing included in the subscription service.

11. The information processing apparatus according to claim 1, wherein the information processing apparatus is an image forming apparatus forming an image on a print medium by using a printing material, and the setup is a setup of activation of subscription service contracts for consumables used in the image forming apparatus, or a setup of an apparatus-included subscription service contract for the image forming apparatus.

12. An update method for an information processing apparatus, the update method comprising:

restricting a process related to updating predetermined firmware installed in the information processing apparatus in a case where setup for activating a subscription service on the information processing apparatus, involving communication with a server, has not been completed; and executing the process related to updating the predetermined firmware in response to completion of the setup for activating the subscription service after update information on update of the predetermined firmware is received.

13. A non-transitory computer readable storage medium on which a program is recorded, the program, when executed, causing a computer to perform:

restricting a process related to updating predetermined firmware installed in the information processing apparatus in a case where setup for activating a subscription service on the information processing apparatus, involving communication with a server, has not been completed; and executing the process related to updating the predetermined firmware in response to completion of the setup for activating the subscription service after update information on update of the predetermined firmware is received.

* * * * *